(12) United States Patent
Ito et al.

(10) Patent No.: US 12,206,065 B2
(45) Date of Patent: Jan. 21, 2025

(54) ALL-SOLID BATTERY AND BATTERY MODULE

(71) Applicant: TAIYO YUDEN CO., LTD., Tokyo (JP)

(72) Inventors: Daigo Ito, Tokyo (JP); Takato Satoh, Tokyo (JP); Sachie Tomizawa, Tokyo (JP); Chie Kawamura, Tokyo (JP); Masashi Sekiguchi, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 443 days.

(21) Appl. No.: 17/009,451

(22) Filed: Sep. 1, 2020

(65) Prior Publication Data

US 2021/0083321 A1    Mar. 18, 2021

(30) Foreign Application Priority Data

Sep. 12, 2019 (JP) ................................ 2019-166531

(51) Int. Cl.
*H01M 10/0562* (2010.01)

(52) U.S. Cl.
CPC ............... *H01M 10/0562* (2013.01)

(58) Field of Classification Search
CPC ......... H01M 10/0562; H01M 10/0585; H01M 4/36; H01M 2004/021
See application file for complete search history.

(56) References Cited

U.S. PATENT DOCUMENTS

| 2013/0149593 A1 | 6/2013 | Hayashi et al. ............... 429/160 |
| 2016/0141716 A1* | 5/2016 | Ito ..................... H01M 10/0562 |
| | | 429/162 |
| 2017/0162854 A1 | 6/2017 | Sugiura |
| 2018/0034033 A1* | 2/2018 | Ramsayer ............. H01M 50/54 |

(Continued)

FOREIGN PATENT DOCUMENTS

| CN | 202633409 U | 12/2012 |
| CN | 103069639 A | 4/2013 |
| CN | 105990557 A | 10/2016 |

(Continued)

OTHER PUBLICATIONS

Office Action issued on Oct. 20, 2023 in a counterpart Chinese Patent Application No. 202010940531.4.

(Continued)

*Primary Examiner* — Osei K Amponsah
(74) *Attorney, Agent, or Firm* — Stein IP, LLC

(57) ABSTRACT

An all-solid battery includes: a multilayer structure that includes a plurality of first electrodes and a plurality of second electrodes, and has a first side face and a second side face adjacent to each other, the plurality of first electrodes and the plurality of second electrodes being alternately stacked with solid electrolyte layers interposed between the plurality of first electrodes and the plurality of second electrodes; a first extraction part exposed on the first side face, the first extraction part being a part of the first electrode; a second extraction part exposed on the second side face, the second extraction part being a part of the second electrode; a first external electrode coupled to the first extraction part on the first side face; and a second external electrode coupled to the second extraction part on the second side face.

8 Claims, 23 Drawing Sheets

(56) References Cited

U.S. PATENT DOCUMENTS

2020/0227780 A1\* 7/2020 Nakamura .......... H01M 50/103

FOREIGN PATENT DOCUMENTS

| CN | 106816640 A | 6/2017 |
| --- | --- | --- |
| CN | 107210416 A | 9/2017 |
| JP | 2000-030670 A | 1/2000 |
| JP | 2007-80812 A | 3/2007 |
| JP | 2015-26555 A | 2/2015 |
| JP | 2015-220110 A | 12/2015 |
| JP | 2018-504763 A | 2/2018 |
| JP | 2018-073518 A | 5/2018 |
| WO | WO 2014/171309 A1 | 10/2014 |
| WO | WO 2018/079165 A1 | 5/2018 |

OTHER PUBLICATIONS

Notice of Reasons for Refusal dated Sep. 5, 2023 in a counterpart Japanese Patent Application No. 2019-166531.

\* cited by examiner

ALL-SOLID BATTERY AND BATTERY MODULE

CROSS-REFERENCE TO RELATED APPLICATION

This application is based upon and claims the benefit of priority of the prior Japanese Patent Application No. 2019-166531, filed on Sep. 12, 2019, the entire contents of which are incorporated herein by reference.

FIELD

A certain aspect of the present embodiments relates to an all-solid battery and a battery module.

BACKGROUND

Secondary batteries have been used in various fields. Secondary batteries having an electrolytic solution have a problem such as leak of the electrolytic solution. Thus, all-solid batteries having a solid electrolyte and other solid elements are being developed.

The all-solid battery has a multilayer structure in which electrodes and solid electrolyte layers are alternately formed, and positive and negative external electrodes are disposed on two side faces facing each other of the multilayer structure as disclosed in, for example, Japanese Patent Application Publication No. 2007-80812. When a plurality of all-solid batteries is mounted on a wiring substrate, a method for electrically connecting the all-solid batteries through the wiring layer of the wiring substrate is suggested as disclosed in, for example, Japanese Patent Application Publication Nos. 2015-26555 and 2015-220110.

However, when the all-solid batteries are electrically connected with use of the wiring layer of the wiring substrate, it is difficult to densely arrange the all-solid batteries in a vacant space of the wiring substrate. Thus, the degree of freedom of the arrangement of the all-solid batteries is limited.

SUMMARY

According to a first aspect of the present embodiments, there is provided an all-solid battery including: a multilayer structure that includes a plurality of first electrodes and a plurality of second electrodes, and has a first side face and a second side face adjacent to each other, the plurality of first electrodes and the plurality of second electrodes being alternately stacked with solid electrolyte layers interposed between the plurality of first electrodes and the plurality of second electrodes; a first extraction part exposed on the first side face, the first extraction part being a part of the first electrode; a second extraction part exposed on the second side face, the second extraction part being a part of the second electrode; a first external electrode coupled to the first extraction part on the first side face; and a second external electrode coupled to the second extraction part on the second side face.

According to a second aspect of the present embodiments, there is provided a battery module including: a plurality of all-solid batteries, each of the all-solid batteries including: a multilayer structure that includes a plurality of first electrodes and a plurality of second electrodes, and has a first side face and a second side face adjacent to each other, the plurality of first electrodes and the plurality of second electrodes being alternately stacked with solid electrolyte layers interposed between the plurality of first electrodes and the plurality of second electrodes, a first extraction part exposed on the first side face, the first extraction part being a part of the first electrode, a second extraction part exposed on the second side face, the second extraction part being a part of the second electrode, a first external electrode coupled to the first extraction part on the first side face, and a second external electrode coupled to the second extraction part on the second side face, wherein the first external electrode of a first all-solid battery of the plurality of all-solid batteries and the second external electrode of a second all-solid battery of the plurality of all-solid batteries are electrically connected.

According to a second aspect of the present embodiments, there is provided a battery module including: a first all-solid battery; a second all-solid battery; a third all-solid battery; and a fourth all-solid battery, wherein each of the first all-solid battery, the second all-solid battery, the third all-solid battery, and the fourth all-solid battery includes: a multilayer structure that includes a plurality of first electrodes and a plurality of second electrodes, and has a first side face, a second side face, a third side face, and a fourth side face, the plurality of first electrodes and the plurality of second electrodes being alternately stacked with solid electrolyte layers interposed between the plurality of first electrodes and the plurality of second electrodes, the first side face and the second side face being adjacent to each other, the third side face being adjacent to the first side face and on an opposite side of the multilayer structure from the second side face, the fourth side face being adjacent to the second side face and on an opposite side of the multilayer structure from the first side face, a first extraction part exposed on the first side face, the first extraction part being a part of the first electrode, a second extraction part exposed on the second side face, the second extraction part being a part of the second electrode, a third extraction part exposed on the third side face, the third extraction part being a part of the first electrode, a fourth extraction part exposed on the fourth side face, the fourth extraction part being a part of the second electrode, a first external electrode coupled to the first extraction part on the first side face, a second external electrode coupled to the second extraction part on the second side face, a third external electrode coupled to the third extraction part on the third side face, and a fourth external electrode coupled to the fourth extraction part on the fourth side face, wherein the third external electrode of the first all-solid battery is electrically connected to the fourth external electrode of the fourth all-solid battery, wherein the second external electrode of the fourth all-solid battery is electrically connected to the fourth external electrode of the second all-solid battery, wherein the second external electrode of the second all-solid battery is electrically connected to the first external electrode of the third all-solid battery, and wherein the third external electrode of the third all-solid battery is electrically connected to the first external electrode of the first all-solid battery.

DETAILED DESCRIPTION

Hereinafter, embodiments will be described with reference to the accompanying drawings.

First Embodiment

Figure 1:
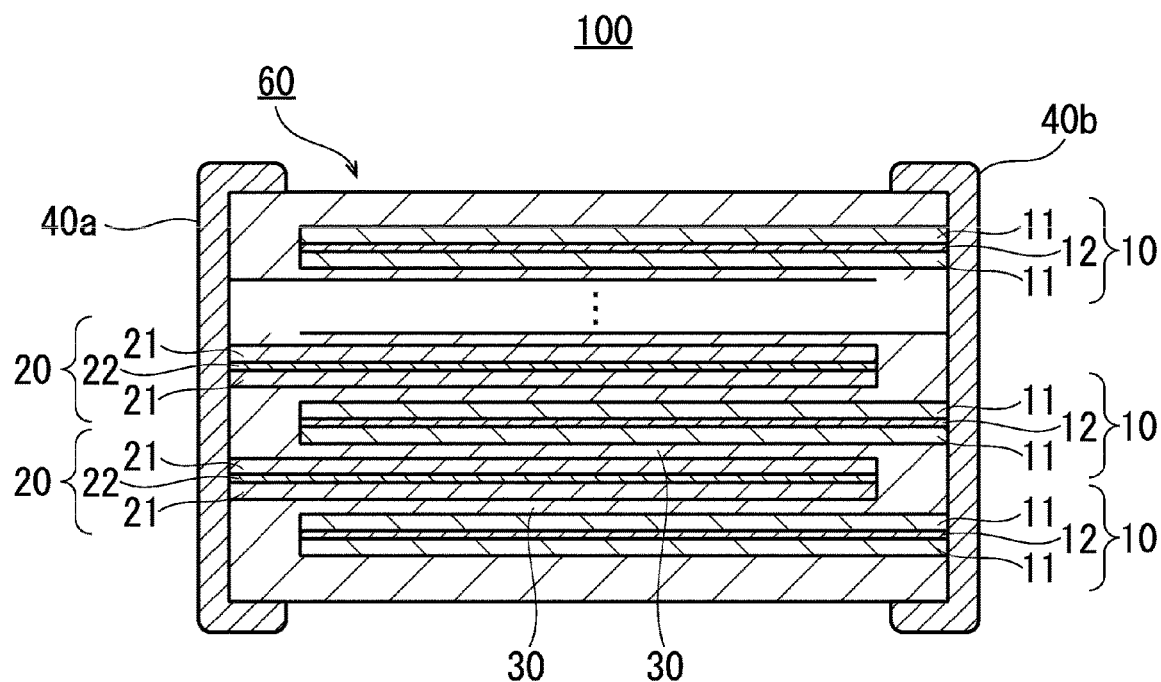
FIG. 1 is a schematic cross-sectional view of a fundamental structure of an all-solid battery in accordance with a first embodiment.

FIG. 1 is a schematic cross-sectional view illustrating a fundamental structure of an all-solid battery 100 in accordance with a first embodiment. As illustrated in FIG. 1, the all-solid battery 100 includes a multilayer structure 60, and a first external electrode 40a and a second external electrode 40b disposed on side faces of the multilayer structure 60. The multilayer structure 60 has a structure in which a plurality of first electrodes 10 and a plurality of second electrodes 20 are alternately stacked with solid electrolyte layers 30 interposed between the first electrodes 10 and the second electrodes 20. Hereinafter, among the outer faces of the multilayer structure 60, outer faces parallel to the direction in which the electrodes 10 and 20 and the solid electrolyte layers 30 are stacked are referred to as side faces.

The first electrode 10 includes a first current collector layer 12 and conductive first electrode layers 11 formed on both principal faces of the first current collector layer 12. The second electrode 20 includes a second current collector layer 22 and conductive second electrode layers 21 formed on both principal faces of the second current collector layer 22. In the present embodiment, as an example, the first electrode 10 is used as a positive electrode and the second electrode 20 is used as a negative electrode.

The first current collector layer 12 may be omitted and the first electrode 10 may be constructed of only the first electrode layer 11. Similarly, the second current collector layer 22 may be omitted and the second electrode 20 may be constructed of only the second electrode layer 21.

The thicknesses of the first electrode 10 and the second electrode 20 are not particularly limited. For example, the first electrode layer 11 has a thickness of approximately 1 μm to 100 μm, and the first current collector layer 12 has a thickness of approximately 1 μm to 20 μm. The second electrode layer 21 has a thickness of approximately 1 μm to 100 μm, and the second current collector layer 22 has a thickness of approximately 1 μm to 20 μm.

At least, the first electrode layer 11 used as a positive electrode contains, as an electrode active material, a material having an olivine type crystal structure. It is preferable that the second electrode layer 21 also contains the electrode active material. Examples of the electrode active material include, but are not limited to, a phosphoric acid salt containing a transition metal and lithium. The olivine type crystal structure is a crystal of natural olivine. It is possible to identify the olivine type crystal structure, by using X-ray diffraction.

$LiCoPO_4$ containing Co may be used as a typical example of the electrode active material having the olivine type crystal structure. Other phosphoric acid salts, in which Co acting as a transition metal is replaced with another transition metal in the above-mentioned chemical formula, may be used. A ratio of Li and $PO_4$ may fluctuate in accordance with a valence. It is preferable to use Co, Mn, Fe, Ni, or the like as the transition metal.

The electrode active material having the olivine type crystal structure acts as a positive electrode active material in the first electrode layer 11 acting as a positive electrode. For example, when only the first electrode layer 11 contains the electrode active material having the olivine type crystal structure, the electrode active material acts as the positive electrode active material. When the second electrode layer 21 also contains an electrode active material having the olivine type crystal structure, a discharge capacity may increase and an operation voltage may increase because of electric discharge, in the second electrode layer 21 acting as a negative electrode. The function mechanism is not completely clear. However, the mechanism may be caused by partial solid-phase formation together with the negative electrode active material.

The second electrode layer 21 may further contain a negative electrode active material. Examples of the negative electrode active material include, but are not limited to, a titanium oxide, a lithium-titanium composite oxide, a lithium-titanium composite salt of phosphoric acid, a carbon, and a vanadium lithium phosphate.

In the forming process of the first electrode layer 11 and the second electrode layer 21, moreover, an oxide-based solid electrolyte material or a conductive material (a conductive auxiliary agent) is added. In the present embodiment, when the material is evenly dispersed into water or organic solvent together with a binder and a plasticizer, paste for electrode layer is obtained. In the present embodiment, a carbon material is included as a conductive auxiliary agent. A metal may be further included as the conductive auxiliary agent. Examples of the metal of the conductive auxiliary agent include, but are not limited to, Pd, Ni, Cu, or Fe, or an alloy thereof.

At least, the solid electrolyte layer 30 is an oxide-based solid electrolyte. For example, the solid electrolyte layer 30 may be a phosphoric acid salt-based solid electrolyte having a NASICON structure. The phosphoric acid salt-based solid electrolyte having a NASICON structure has a high conductivity and is stable in normal atmosphere. The phosphoric acid salt-based solid electrolyte is, for example, a salt of phosphoric acid including lithium. Examples of the salt of phosphoric acid include, but are not limited to, a composite salt of phosphoric acid with Ti (for example, $LiTi_2(PO_4)_3$). Alternatively, at least a part of Ti may be replaced with a quadrivalent transition metal such as, but not limited to, Ge, Sn, Hf, or Zr. To increase a content of Li, a part of Ti may be replaced with a trivalent transition metal such as, but not limited to, Al, Ga, In, Y or La. More specifically, examples of the phosphoric acid salt including lithium and having a NASICON structure include $Li_{1+x}Al_xGe_{2-x}(PO_4)_3$, $Li_{1+x}AlxZr_{2-x}(PO_4)_3$, and $Li_{1+x}Al_xTi_{2-x}PO_4)_3$. For example, it is preferable that a Li—Al—Ge—PO$_4$-based material, to which a transition metal contained in the phosphoric acid salt having the olivine type crystal structure contained in at least one of the first electrode layer 11 and the second electrode layer 21 is added in advance, is used. For example, when the first electrode layer 11 and the second electrode layer 21 contain a phosphoric acid salt containing at least one of Co and Li, it is preferable that the solid electrolyte layer 30 contains a Li—Al—Ge—PO$_4$-based material to which Co is added in advance. In this case, it is possible to inhibit the transition metal contained in the electrode active material from solving into the electrolyte. When the first electrode layer 11 and the second electrode layer 21 contain a phosphoric acid salt containing Li and a transition element other than Co, it is preferable that the solid electrolyte layer 30 contains a Li—Al—Ge—PO$_4$-based material to which the transition element is added in advance.

The thickness of the solid electrolyte layer 30 is not particularly limited, and in the present embodiment, the thickness is approximately 1 μm to 100 μm.

Figure 2:
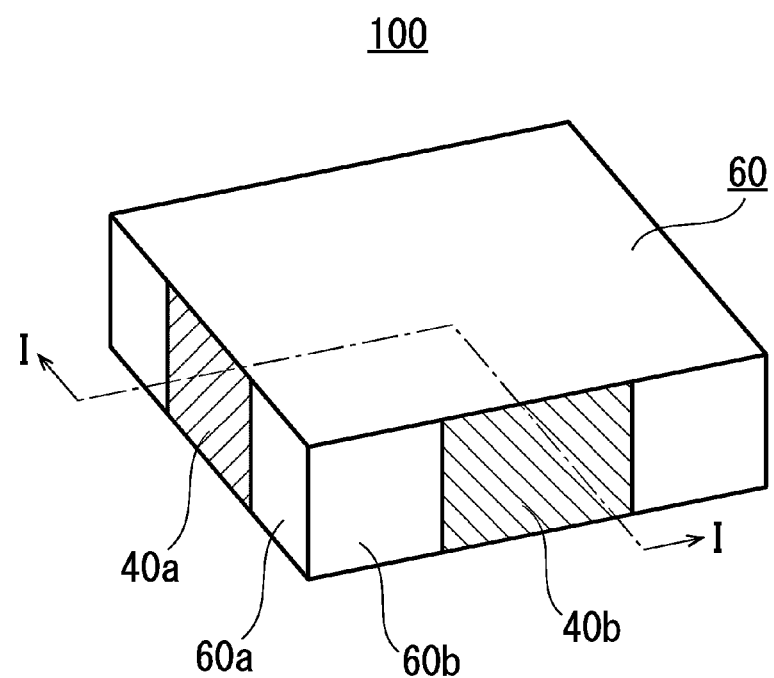
FIG. 2 is an external view of the all-solid battery in accordance with the first embodiment.

FIG. 2 is an external view of the all-solid battery 100. FIG. 1 corresponds to a cross-sectional view taken along line I-I in FIG. 2. As illustrated in FIG. 2, the multilayer structure 60 has a substantially rectangular shape in a top view, and includes a first side face 60a and a second side face 60b adjacent to each other. The first external electrode 40a is formed on the first side face 60a, and the second external electrode 40b is formed on the second side face 60b.

Figure 3:
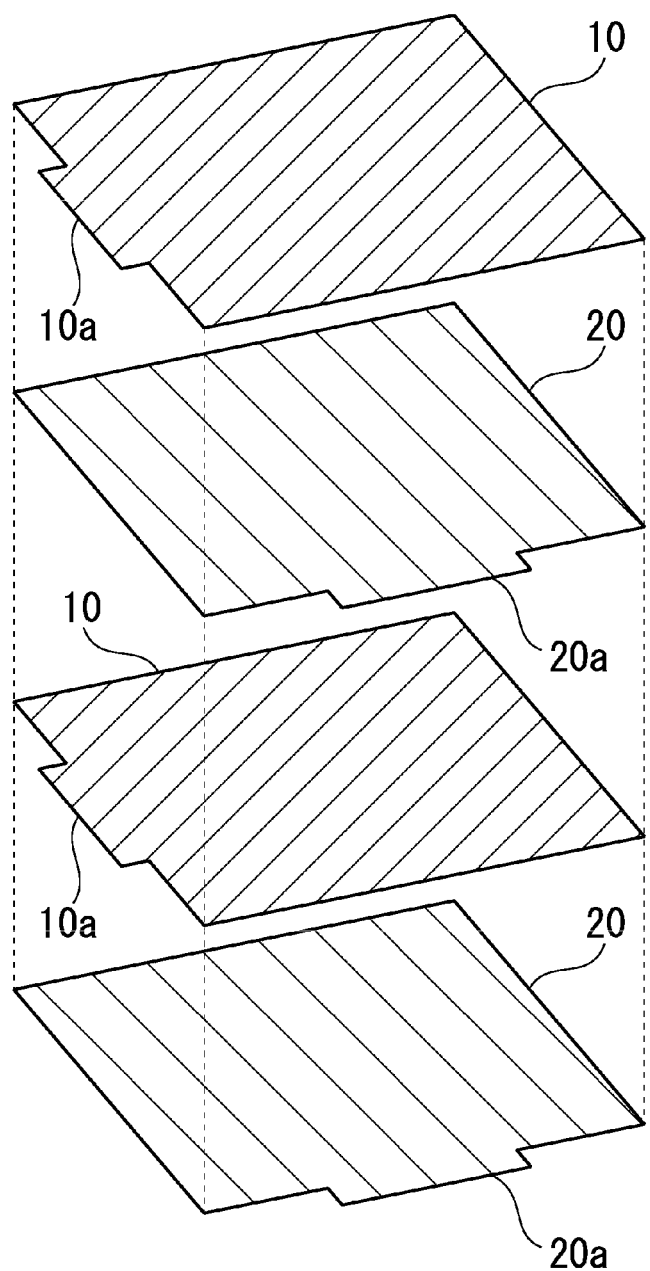
FIG. 3 is an exploded perspective view of the all-solid battery in accordance with the first embodiment.

FIG. 3 is an exploded perspective view of the all-solid battery 100. In FIG. 3, the illustration of the solid electrolyte layer 30 is omitted. The same applies to FIG. 4A and FIG. 4B. As illustrated in FIG. 3, each of the first electrodes 10 includes a first extraction part 10a protruding toward the first side face 60a. Each of the second electrodes 20 includes a second extraction part 20a protruding toward the second side face 60b.

Figure 4A:
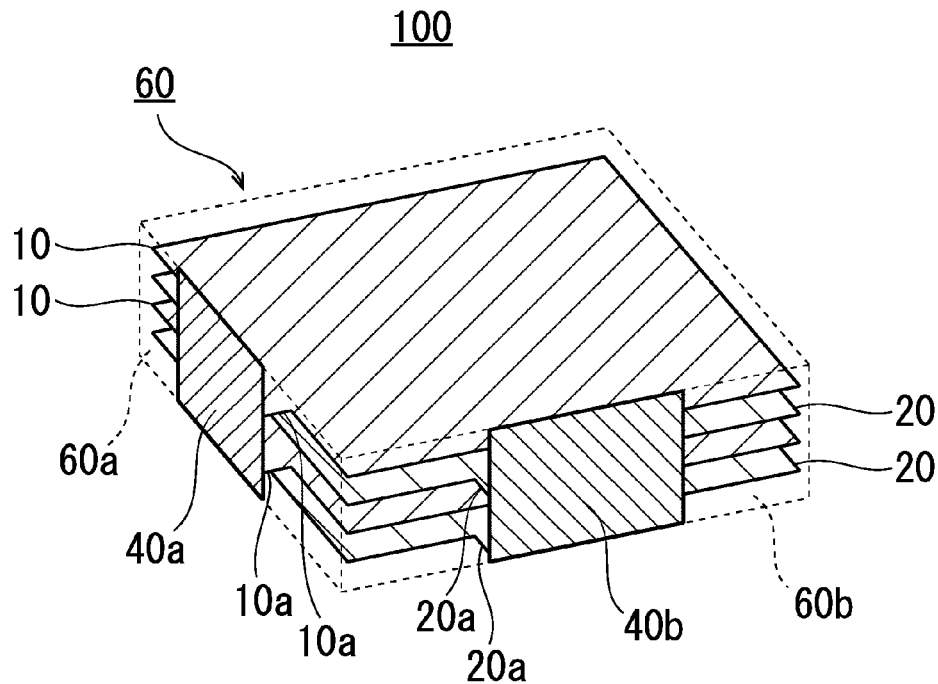
FIG. 4A is a perspective view of a multilayer structure in which first electrodes and second electrodes are stacked in the first embodiment.

FIG. 4A is a perspective view of the multilayer structure 60 formed by stacking the electrodes 10 and 20. As illustrated in FIG. 4A, the first extraction part 10a of the first electrode 10 is exposed on the first side face 60a of the multilayer structure 60, and the first external electrode 40a is coupled to the first extraction part 10a on the first side face 60a.

In addition, the second extraction part 20a of the second electrode 20 is exposed on the second side face 60b of the multilayer structure 60, and the second external electrode 40b is coupled to the second extraction part 20a on the second side face 60b.

Figure 4B:
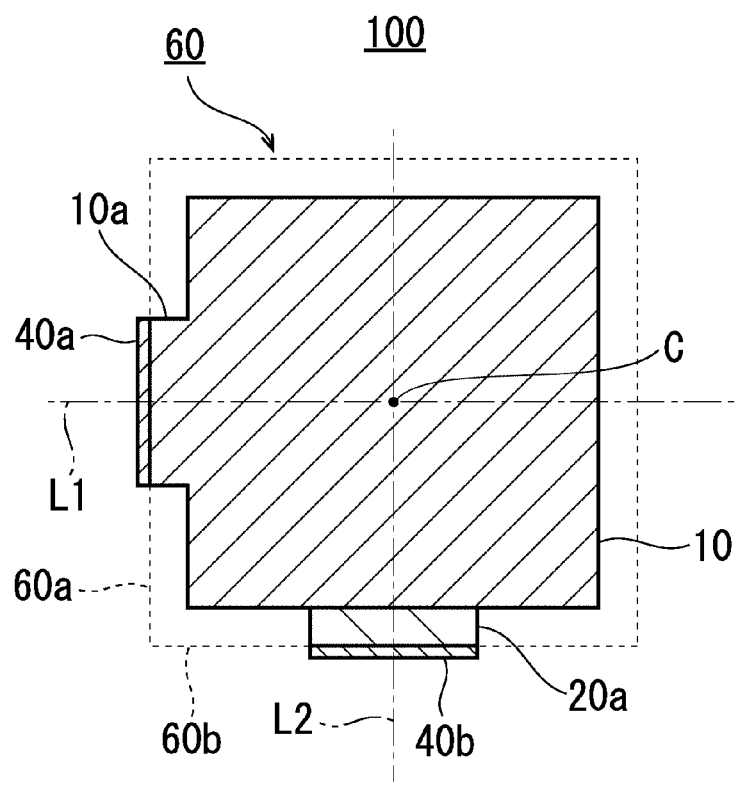
FIG. 4B is a top view of the all-solid battery in accordance with the first embodiment.

FIG. 4B is a top view of the all-solid battery 100. As illustrated in FIG. 4B, a virtual line L1 passing through the center C of the multilayer structure 60 and the first external electrode 40a intersects at approximately 90 degrees with a virtual line L2 passing through the center C and the second external electrode 40b.

Next, a battery module including the all-solid battery 100 will be described.

Figure 5A:
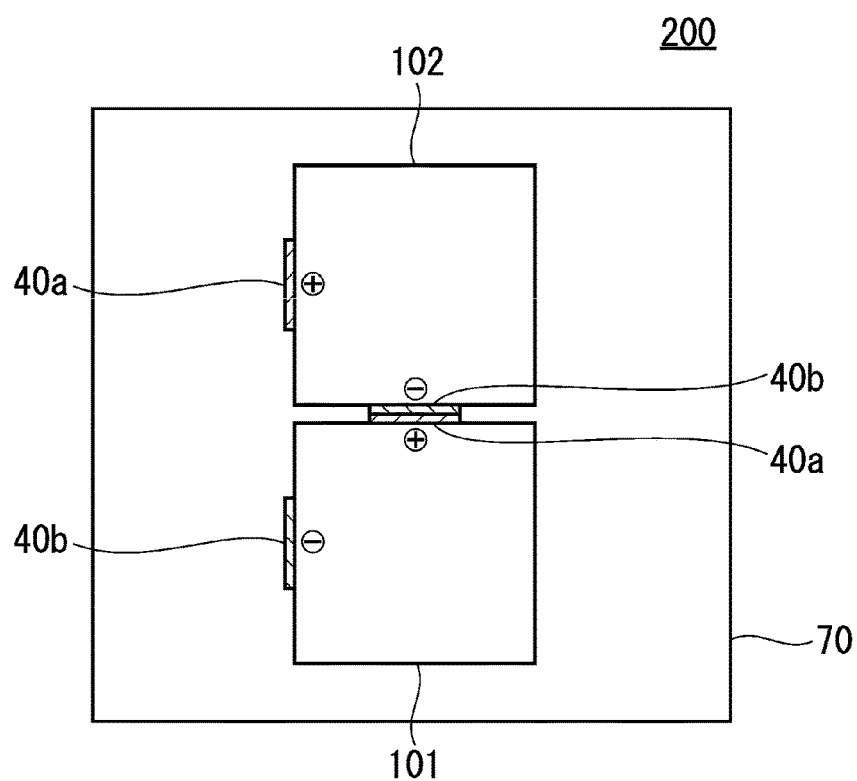
FIG. 5A is a top view of a battery module in accordance with the first embodiment and FIG. 5B is a top view of a battery module in accordance with another example of the first embodiment.

FIG. 5A is a top view of a battery module in accordance with the first embodiment. As illustrated in FIG. 5A, a battery module 200 includes a wiring substrate 70, and a first all-solid battery 101 and a second all-solid battery 102 disposed on the top face of the wiring substrate 70. The first all-solid battery 101 and the second all-solid battery 102 have the same structure as the all-solid battery 100 and are arranged in line in a top view.

In this embodiment, the first external electrode 40a of the first all-solid battery 101 is coupled to the second external electrode 40b of the second all-solid battery 102. Thus, the first all-solid battery 101 and the second all-solid battery 102 are connected in series. Therefore, an electromotive force twice the electromotive force obtained when only one of them is used is obtained.

Figure 5B:
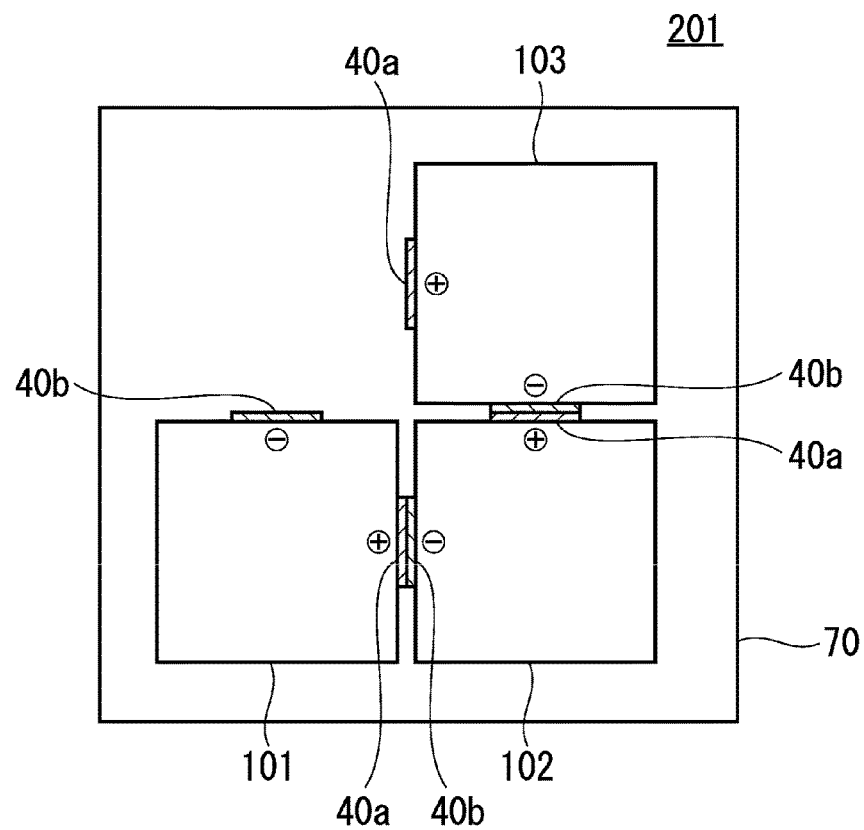

FIG. 5B is a top view of a battery module in accordance with another example of the first embodiment. As illustrated in FIG. 5B, in this battery module 201, first to third all-solid batteries 101 to 103 having the same structure as the all-solid battery 100 are arranged in an L-shape on the top face of the wiring substrate 70. In this example, the first external electrode 40a of the first all-solid battery 101 is coupled to the second external electrode 40b of the second all-solid battery 102, and the first external electrode 40a of the second all-solid battery 102 is coupled to the second external electrode 40b of the third all-solid battery 103.

Thus, the first to third all-solid batteries 101 to 103 are connected in series. Therefore, the electromotive force of the battery module 201 is further increased compared with that of the example of FIG. 5A. Additionally, the L-shaped vacant space of the wiring substrate 70 can be effectively used by arranging the first to third all-solid batteries 101 to 103 in an L-shape.

As described above, in the all-solid battery 100 in accordance with the first embodiment, as illustrated in FIG. 4A, the external electrodes 40a and 40b are respectively formed on the side faces 60a and 60b adjacent to each other of the multilayer structure 60. Thus, the all-solid batteries 100 can be arranged not only in a linear layout illustrated in FIG. 5A but also in an L-shaped layout illustrated in FIG. 5B. Thus, the degree of freedom to arrange the all-solid batteries 100 is increased.

Furthermore, the adjacent all-solid batteries 100 are connected by making the first external electrode 40a and the second external electrode 40b be in contact with each other. Thus, the all-solid batteries 100 can be densely arranged.

Comparative Example

Figure 6:
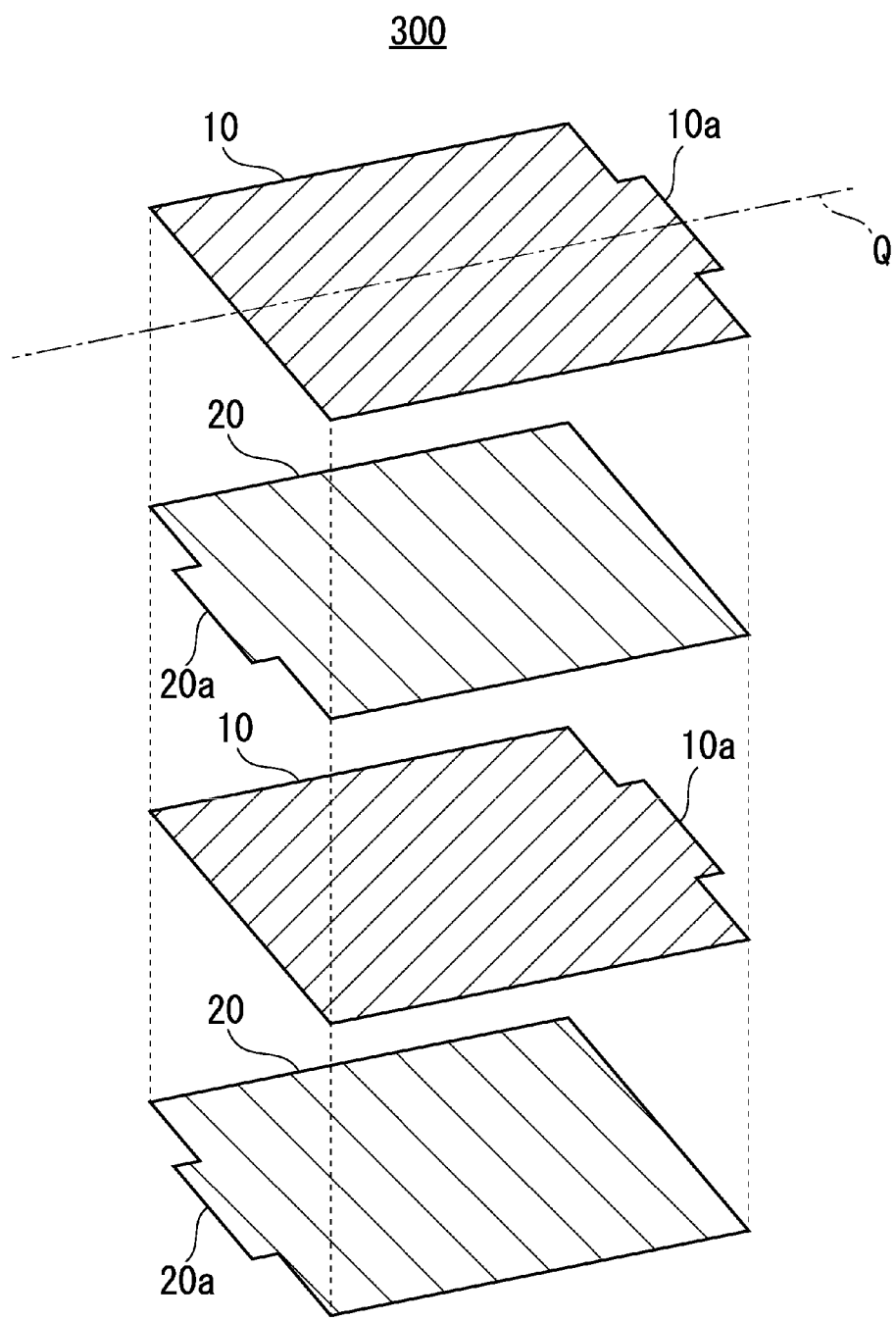
FIG. 6 is an exploded perspective view of an all-solid battery in accordance with a comparative example.

Next, a comparative example will be described. FIG. 6 is an exploded perspective view of an all-solid battery 300 in accordance with the comparative example. In this comparative example, the first extraction part 10a of the first electrode 10 and the second extraction part 20a of the second electrode 20 are oriented in opposite directions, and these extraction parts 10a and 20a are arranged on a virtual line Q in a top view.

Figure 7:
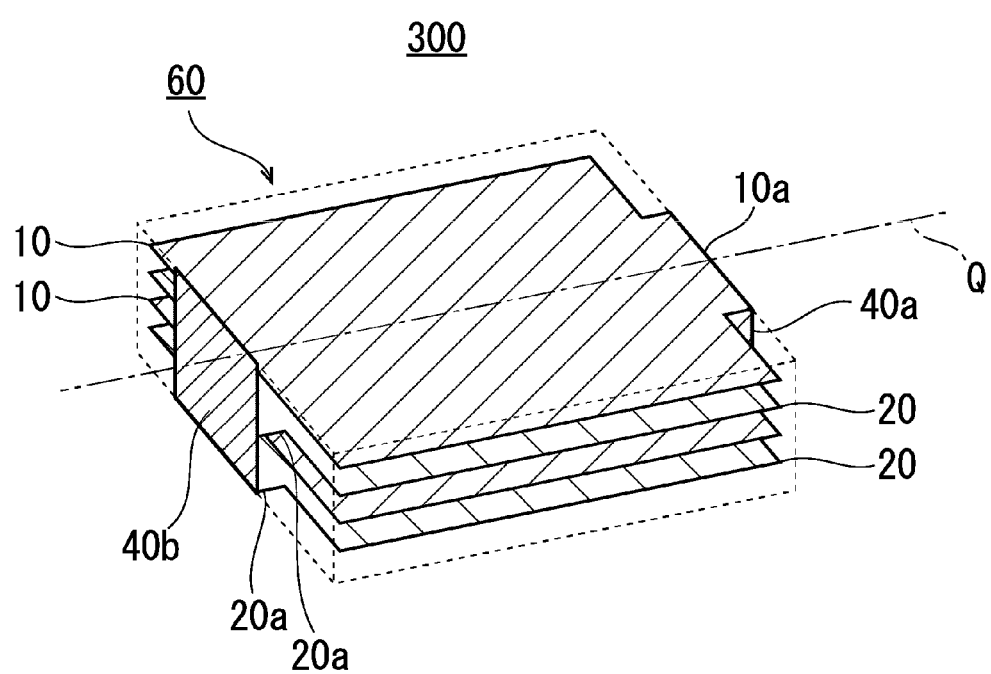
FIG. 7 is a perspective view of a multilayer structure in which the first electrodes and the second electrodes are stacked in the comparative example.

FIG. 7 is a perspective view of the multilayer structure 60 formed by stacking the electrodes 10 and 20 in the comparative example. As illustrated in FIG. 7, the first external electrode 40a is coupled to the first extraction part 10a, and the second external electrode 40b is coupled to the second extraction part 20a.

In the all-solid battery 300, the external electrodes 40a and 40b are arranged on the virtual line Q in a top view. Thus, to connect the external electrodes 40a and 40b of the all-solid batteries 300, these all-solid batteries 300 need to be arranged on the virtual line Q. As a result, the L-shaped layout illustrated in FIG. 5B is not achieved, and effective use of the vacant space of the wiring substrate 70 is difficult.

Second Embodiment

Figure 8:
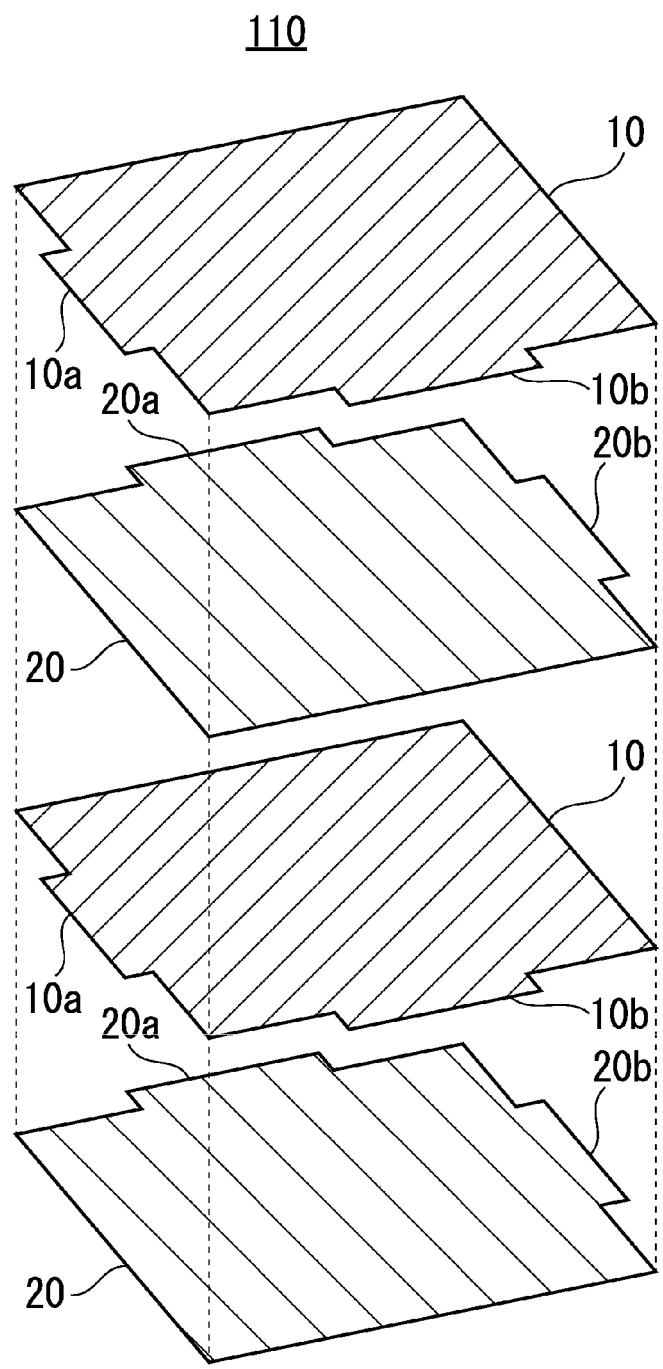
FIG. 8 is an exploded perspective view of an all-solid battery in accordance with a second embodiment.

FIG. 8 is an exploded perspective view of an all-solid battery 110 in accordance with a second embodiment. In FIG. 8, the same reference numerals are used for the elements identical to the elements described in the first embodiment, and the description thereof is thus omitted in the description hereinafter. In FIG. 8, the illustration of the solid electrolyte layer 30 is omitted. The same applies to FIG. 9A and FIG. 9B.

As illustrated in FIG. 8, in the second embodiment, the first electrode 10 includes the first extraction part 10a and a third extraction part 10b. Similarly, the second electrode 20 includes the second extraction part 20a and a fourth extraction part 20b.

Figure 9A:
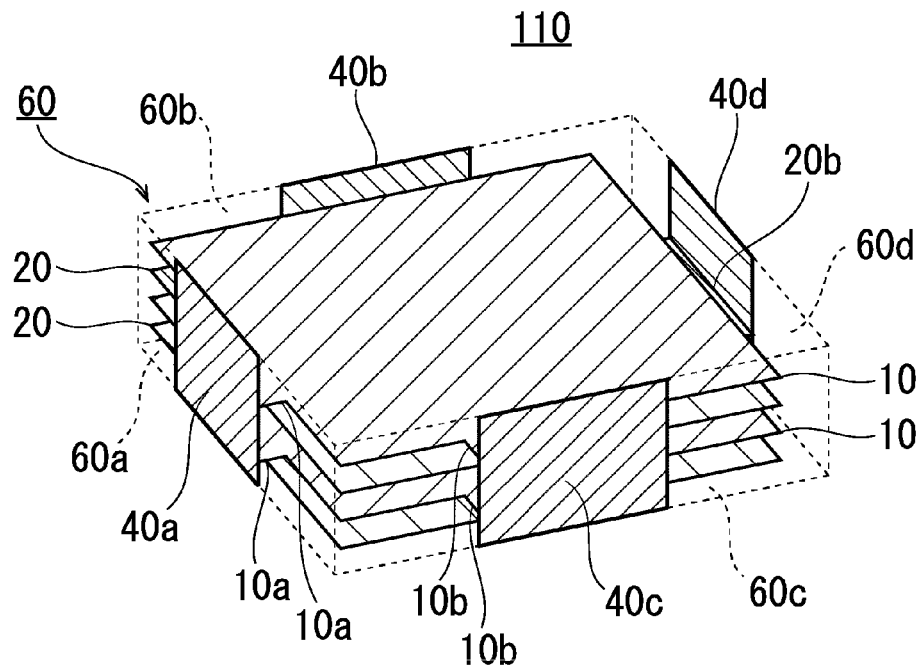
FIG. 9A is a perspective view of a multilayer structure in which the first electrodes and the second electrodes are stacked in the second embodiment.

FIG. 9A is a perspective view of the multilayer structure 60 formed by stacking the electrodes 10 and 20. As illustrated in FIG. 9A, the multilayer structure 60 has first to fourth side faces 60a to 60d. Among them, the first side face 60a and the second side face 60b are two side faces adjacent to each other. The third side face 60c is a side face that is adjacent to the first side face 60a and is on the opposite side of the multilayer structure 60 from the second side face 60b. The fourth side face 60d is a side face that is adjacent to the second side face 60b and is on the opposite side of the multilayer structure 60 from the first side face 60a.

In the second embodiment, the third extraction part 10b of the first electrode 10 is exposed on the third side face 60c, and the third extraction part 10b is coupled to a third external electrode 40c on the third side face 60c. Additionally, the fourth extraction part 20b of the second electrode 20 is exposed on the fourth side face 60d, and is coupled to a fourth external electrode 40d on the fourth side face 60d.

Figure 9B:
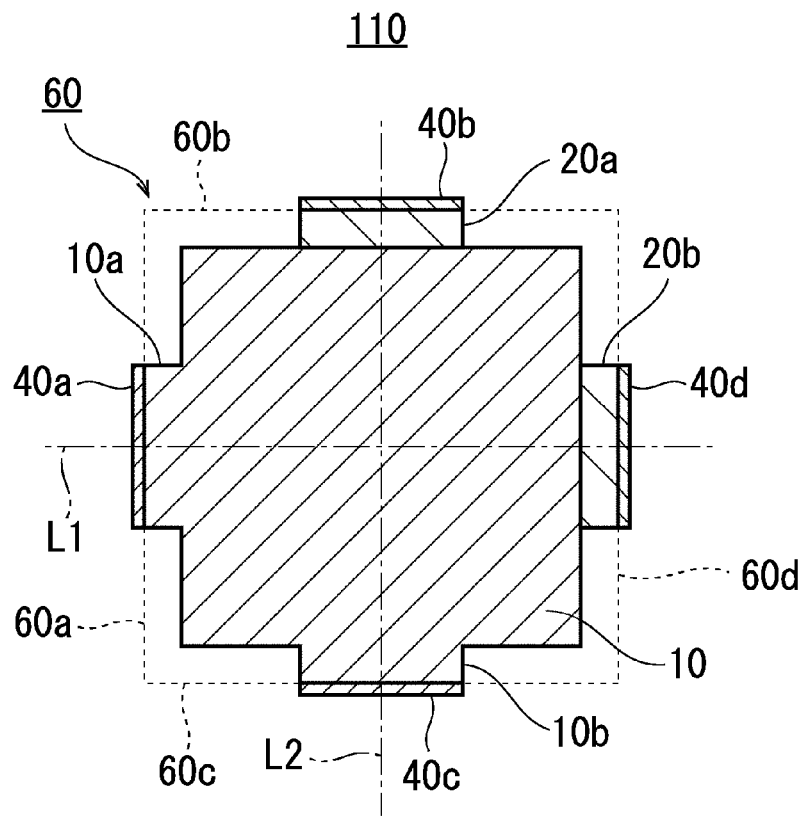
FIG. 9B is a top view of the multilayer structure and each external electrode of the second embodiment.

FIG. 9B is a top view of the external electrodes 40a to 40d of the multilayer structure 60. As illustrated in FIG. 9B, the virtual line L1 passing through the first external electrode 40a and the fourth external electrode 40d intersects at approximately 90 degrees with the virtual line L2 passing through the second external electrode 40b and the third external electrode 40c.

The all-solid battery 110 includes the external electrodes 40a to 40d on four sides in a top view. Thus, the number of ways of connecting the all-solid batteries 110 through the external electrodes 40a to 40d can be increased. As a result, battery modules having various layouts described later can be achieved, and the vacant space of the wiring substrate can be effectively used.

Next, a battery module including the all-solid batteries 110 in accordance with the second embodiment will be described.

Figure 10:
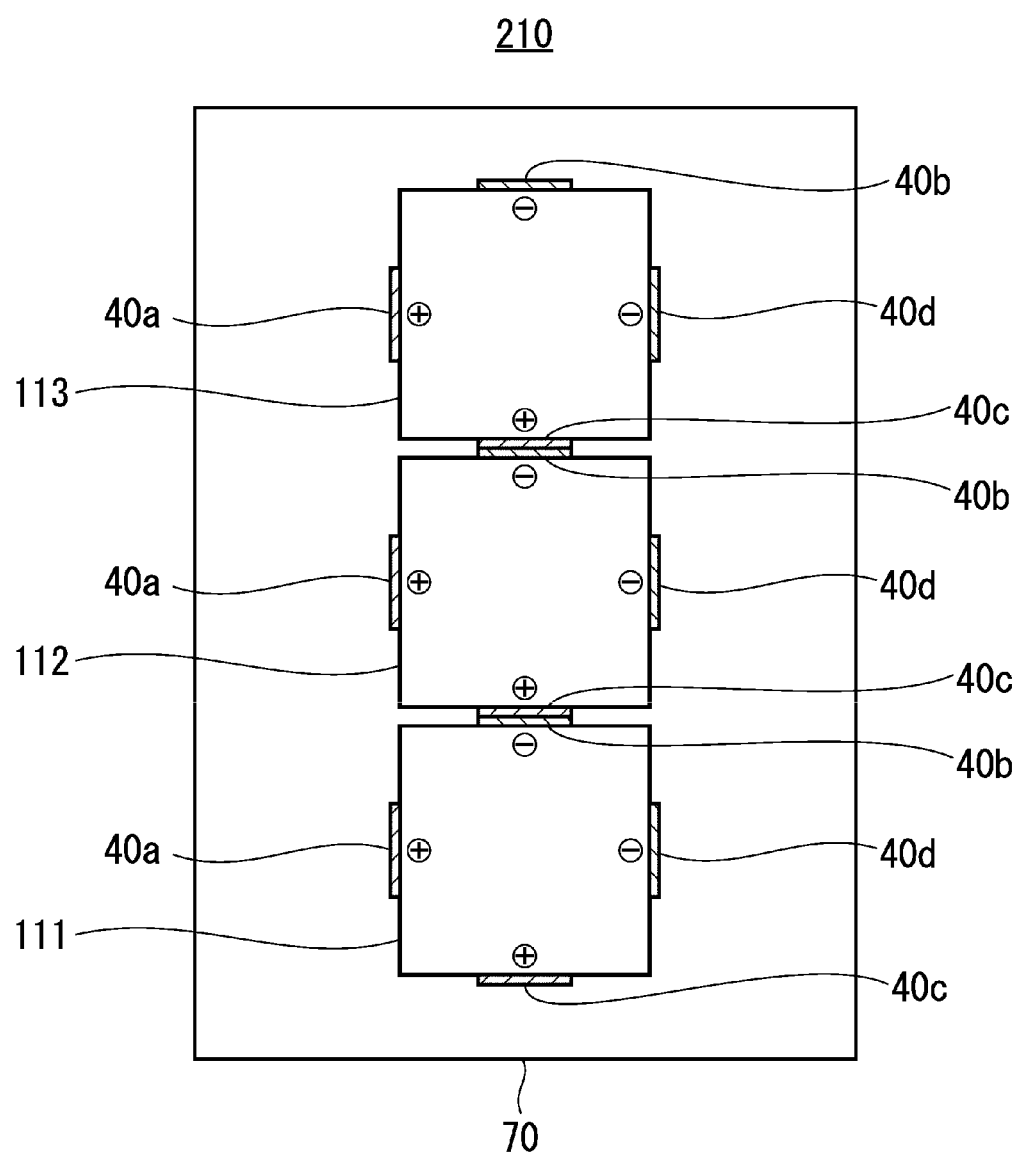
FIG. 10 is a top view of a battery module in accordance with the second embodiment.

FIG. 10 is a top view of a battery module in accordance with the second embodiment. As illustrated in FIG. 10, a battery module 210 includes the wiring substrate 70, and first to third all-solid batteries 111 to 113 disposed on the top face of the wiring substrate 70. The first to third all-solid batteries 111 to 113 have the same structure as the all-solid battery 110 in accordance with the second embodiment, and are arranged in line in a top view.

In the second embodiment, the second external electrode 40b of the first all-solid battery 111 is coupled to the third external electrode 40c of the second all-solid battery 112. The second external electrode 40b of the second all-solid battery 112 is coupled to the third external electrode 40c of the third all-solid battery 113. Thus, the first to third all-solid batteries 111 to 113 are connected in series. Therefore, the electromotive force of the battery module 210 is increased compared with the electromotive force obtained when only one of them is used.

The number of all-solid batteries connected in series is three in the example of FIG. 10, but this does not intend to suggest any limitation. The battery module 210 generating a desired electromotive force may be constructed of two all-solid batteries connected in series or four or more all-solid batteries connected in series.

Figure 11A:
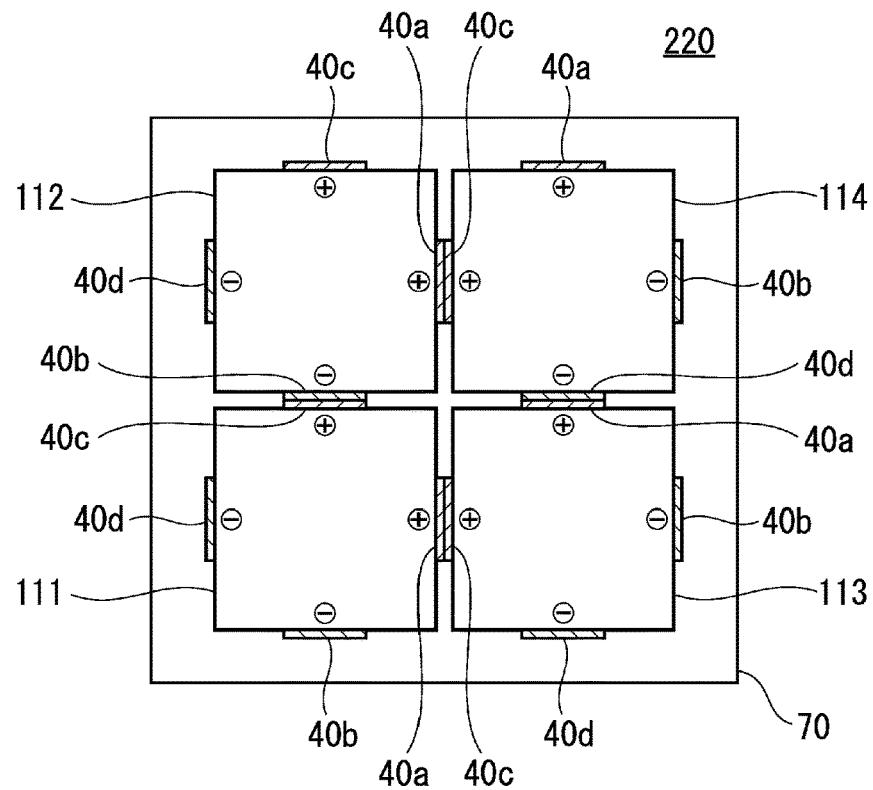
FIG. 11A is a top view of a battery module in accordance with another example of the second embodiment.

Furthermore, the battery module may be structured such that a parallel connection and a series connection are mixed as follows. FIG. 11A is a top view of a battery module in accordance with another example of the second embodiment. As illustrated in FIG. 11A, a battery module 220 includes the wiring substrate 70 and first to fourth all-solid batteries 111 to 114 disposed on the top face of the battery module 220. The first to fourth all-solid batteries 111 to 114 have the same structure as the all-solid battery 110 in accordance with the second embodiment. The first to fourth all-solid batteries 111 to 114 are arranged in a 2×2 matrix form on the wiring substrate 70 in a top view.

Additionally, in this example, the first all-solid battery 111 and the second all-solid battery 112 are connected in series by connecting the third external electrode 40c of the first all-solid battery 111 to the second external electrode 40b of the second all-solid battery 112.

In addition, the first external electrode 40a of the third all-solid battery 113 is coupled to the fourth external electrode 40d of the fourth all-solid battery 114, and thereby, the third all-solid battery 113 and the fourth all-solid battery 114 are connected in series.

Furthermore, the first external electrode 40a of the first all-solid battery 111 is coupled to the third external electrode 40c of the third all-solid battery 113, and thereby, the first all-solid battery 111 and the third all-solid battery 113 are connected in parallel. Similarly, the first external electrode 40a of the second all-solid battery 112 is coupled to the third external electrode 40c of the fourth all-solid battery 114, and thereby, the second all-solid battery 112 and the fourth all-solid battery 114 are connected in parallel.

In the battery module 220, the first all-solid battery 111 and the second all-solid battery 112 are connected in series, and the third all-solid battery 113 and the fourth all-solid battery 114 are connected in series. Thus, an electric potential difference between the second external electrode 40b of the first all-solid battery 111 and the third external electrode 40c of the second all-solid battery 112 can be made to be twice the electric potential difference between the external electrodes 40b and 40c in one all-solid battery. Similarly, the electric potential difference between the fourth external electrode 40d of the third all-solid battery 113 and the first external electrode 40a of the fourth all-solid battery 114 can be made to be twice the electric potential difference between the electrodes 40a and 40d in one all-solid battery. Furthermore, the capacitance that is twice the capacitance of one all-solid battery is obtained because the first all-solid battery 111 and the third all-solid battery 113 are connected in parallel and the second all-solid battery 112 and the fourth all-solid battery 114 are connected in parallel.

Figure 11B:
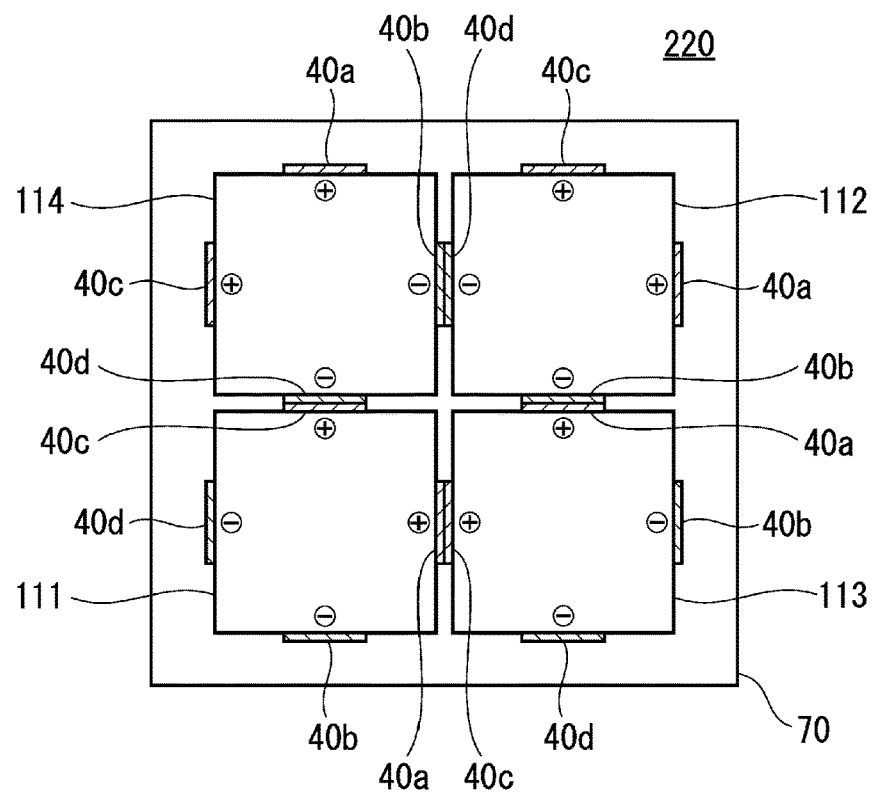
FIG. 11B is a top view of a battery module in accordance with yet another example of the second embodiment.

The method of connecting the all-solid batteries 111 to 114 is not limited to the aforementioned method. FIG. 11B is a top view of a battery module in accordance with yet another example of the second embodiment. As illustrated in FIG. 11B, the battery module 220 is a battery module obtained by interchanging the positions of the second all-solid battery 112 and the fourth all-solid battery 114 in FIG. 11A.

In this case, the third external electrode 40c of the first all-solid battery 111 and the fourth external electrode 40d of the fourth all-solid battery 114 are electrically connected, and the second external electrode 40b of the fourth all-solid battery 114 and the fourth external electrode 40d of the second all-solid battery 112 are electrically connected. Additionally, the second external electrode 40b of the second all-solid battery 112 and the first external electrode 40a of the third all-solid battery 113 are electrically connected, and the third external electrode 40c of the third all-solid battery 113 and the first external electrode 40a of the first all-solid battery 111 are electrically connected.

In this case, one of four electrodes, which are the first external electrode 40a and the third external electrode 40c of the fourth all-solid battery 114 and the first external electrode 40a and the third external electrode 40c of the second all-solid battery 112, can be selected as an extraction electrode on a positive electrode side. Additionally, one of four electrodes, which are the second external electrode 40b and the fourth external electrode 40d of the first all-solid battery 111 and the second external electrode 40b and the fourth external electrode 40d of the third all-solid battery 113, can be selected as an extraction electrode on a negative electrode side. Therefore, it is possible to increase the number of choices of the part from which the positive electrode or the negative electrode is extracted, and it is possible to improve the degree of freedom of the position of the wiring line connected to the electrode.

As described above, in the all-solid battery 110 in accordance with the second embodiment, the external electrodes 40a to 40d are respectively formed on four side faces 60a to 60d of the multilayer structure 60 as illustrated in FIG. 9A. This structure allows the all-solid batteries 110 to be arranged in a matrix form as illustrated in FIG. 11, and the degree of freedom to arrange the all-solid batteries 110 is increased.

Furthermore, the all-solid batteries 110 adjacent to each other can be connected by making the first to fourth external electrodes 40a to 40d be in contact. Thus, the all-solid batteries 100 can be densely arranged.

In addition, the electromotive force and the capacitance can be adjusted for the use application by mixing the parallel connection and the series connection in the battery module 220.

In this example, the first to fourth external electrodes 40a to 40d are separated from each other, but the layout of the external electrodes 40a to 40d is not limited.

Figure 12A:
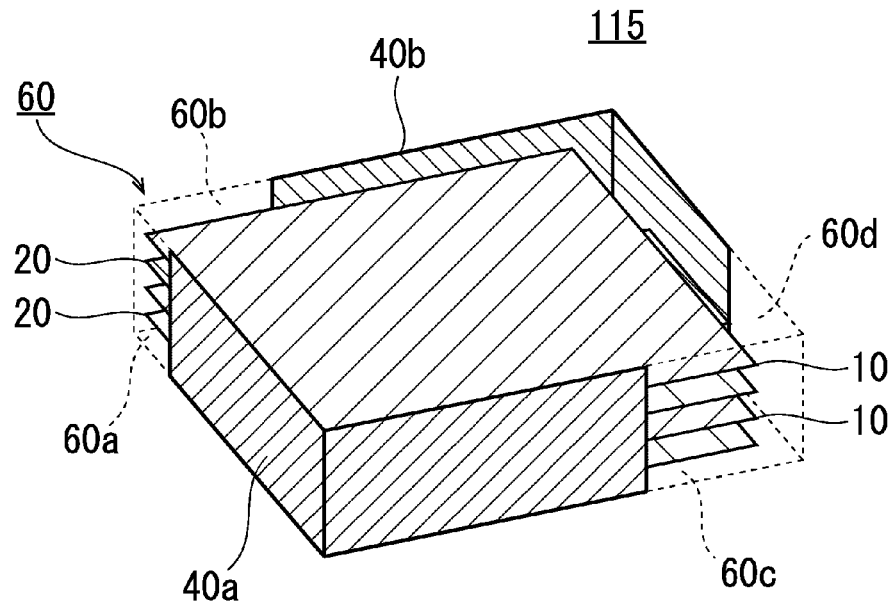
FIG. 12A is a perspective view of an all-solid battery in accordance with another example of the second embodiment.
Figure 12B:
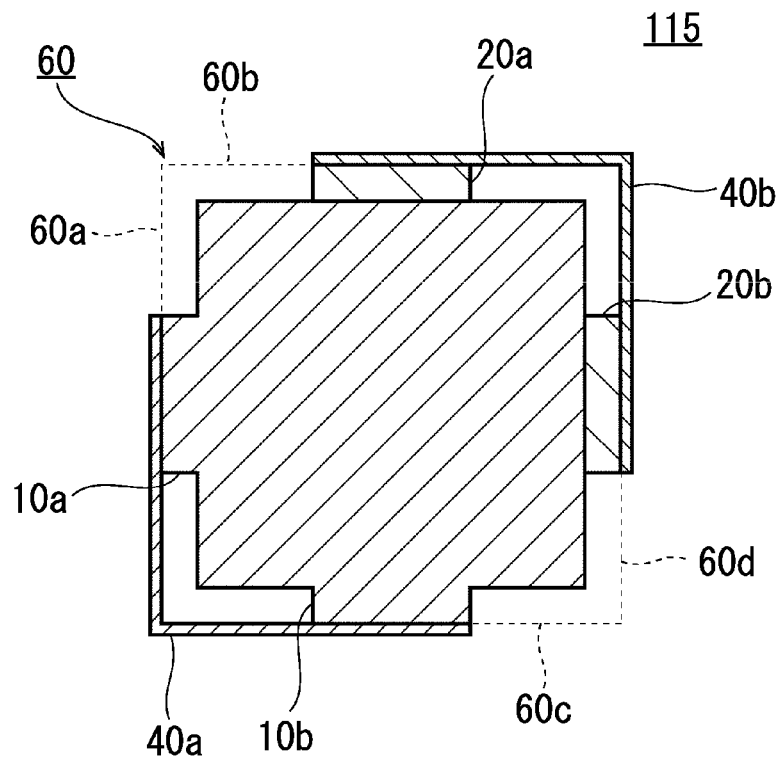
FIG. 12B is a top view of an all-solid battery in accordance with yet another example of the second embodiment.

FIG. 12A is a perspective view of an all-solid battery 115 in accordance with another example of the second embodiment, and FIG. 12B is a top view of the all-solid battery 115. In FIG. 12A and FIG. 12B, the illustration of the solid electrolyte layer 30 is omitted.

As illustrated in FIG. 12A and FIG. 12B, in this example, the first external electrode 40a is coupled to the first extraction part 10a on the first side face 60a of the multilayer structure 60, and the first external electrode 40a is also coupled to the third extraction part 10b on the third side face 60c. Additionally, the second external electrode 40b is coupled to the second extraction part 20a on the second side face 60b of the multilayer structure 60, and the second external electrode 40b is also coupled to the fourth extraction part 20b on the fourth side face 60d.

This structure allows the first external electrode 40a to extend across the first side face 60a and the third side face 60c. Thus, compared with the example illustrated in FIG. 9A and FIG. 9B, the area of the first external electrode 40a is large, and the resistance of the first external electrode 40a is reduced. For the same reason, the resistance of the second external electrode 40b is also reduced.

Third Embodiment

In the first and second embodiments, a plurality of all-solid batteries is arranged in a plane. In a third embodiment, first to third all-solid batteries 121 to 123 are stacked as follows.

Figure 13:
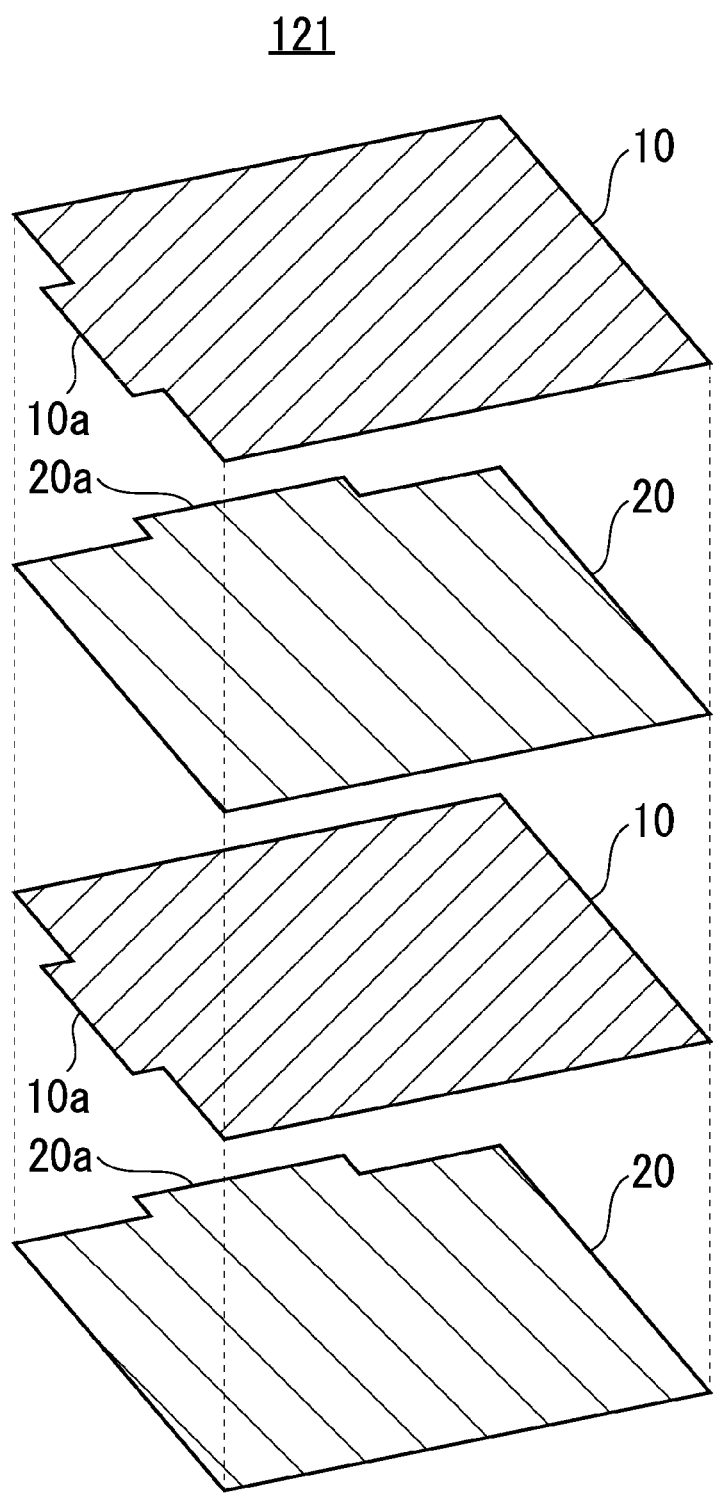
FIG. 13 is an exploded perspective view of a first all-solid battery in accordance with a third embodiment.

FIG. 13 is an exploded perspective view of the first all-solid battery 121 in accordance with the third embodiment. In FIG. 13, the same reference numerals are used for the elements identical to the elements described in the first and second embodiments, and the description thereof is omitted hereinafter. In FIG. 13, illustration of the solid electrolyte layer 30 is omitted. The same applies to FIG. 14 to FIG. 21 described later.

As illustrated in FIG. 13, also in the third embodiment, the first electrode 10 includes the first extraction part 10a, and the second electrode 20 includes the second extraction part 20a.

Figure 14:
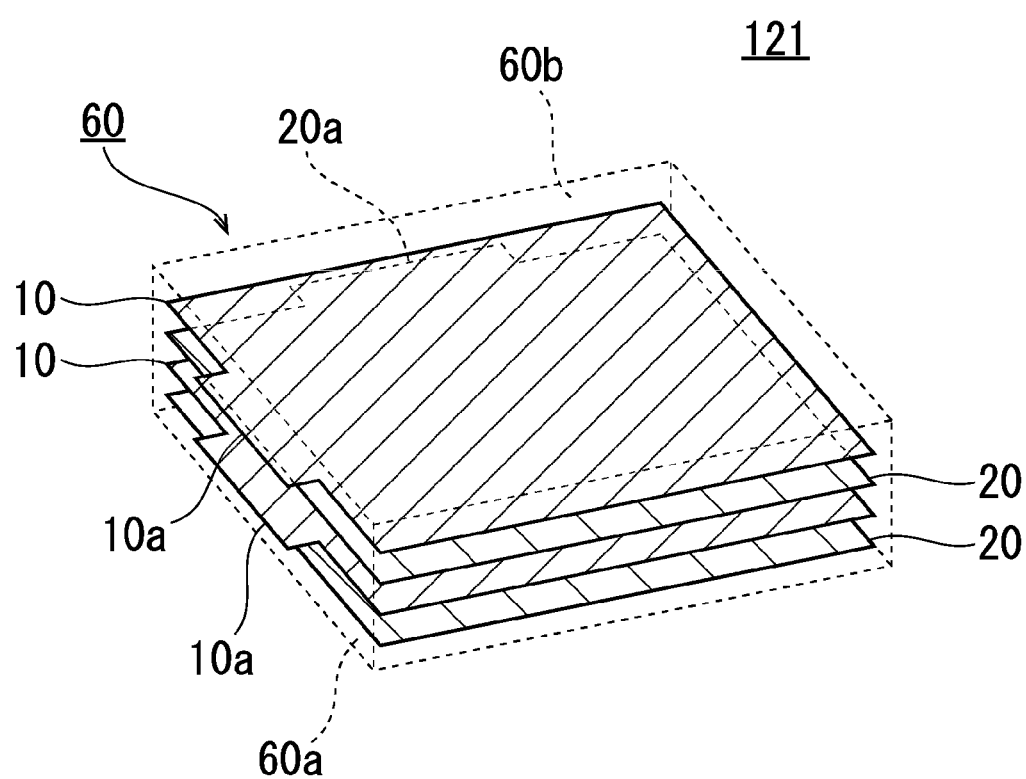
FIG. 14 is a perspective view of a multilayer structure in which the first electrodes and the second electrodes are stacked in FIG. 13.

FIG. 14 is a perspective view of the multilayer structure 60 formed by stacking the electrodes 10 and 20 in FIG. 13. As illustrated in FIG. 14, the first extraction part 10a of the first electrode 10 is exposed on the first side face 60a of the multilayer structure 60, and the second extraction part 20a of the second electrode 20 is exposed on the second side face 60b.

Figure 15:
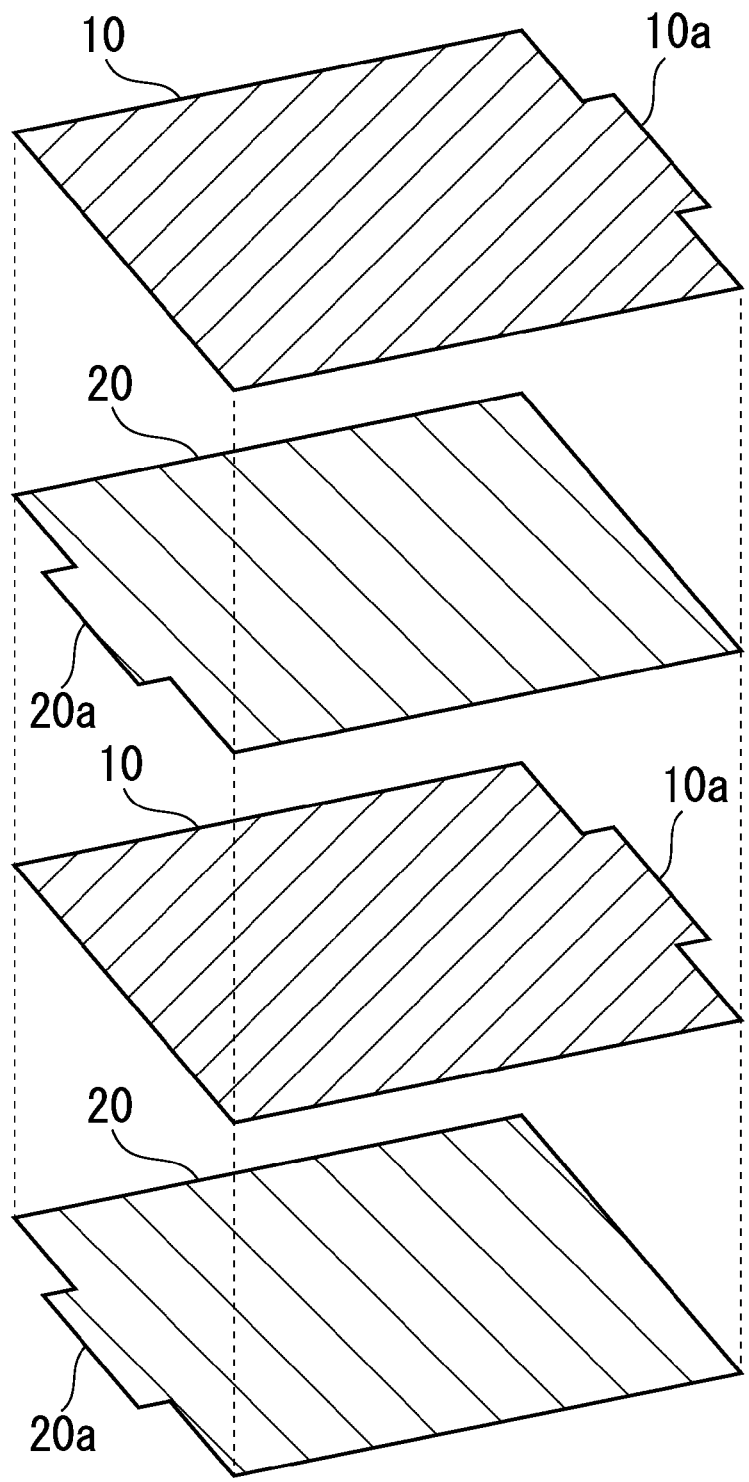
FIG. 15 is an exploded perspective view of a second all-solid battery in accordance with the third embodiment.

FIG. 15 is an exploded perspective view of the second all-solid battery 122 in accordance with the third embodiment. As illustrated in FIG. 15, in the second all-solid battery 122, the first extraction part 10a of the first electrode 10 and the second extraction part 20a of the second electrode 20 are oriented in opposite directions.

Figure 16:
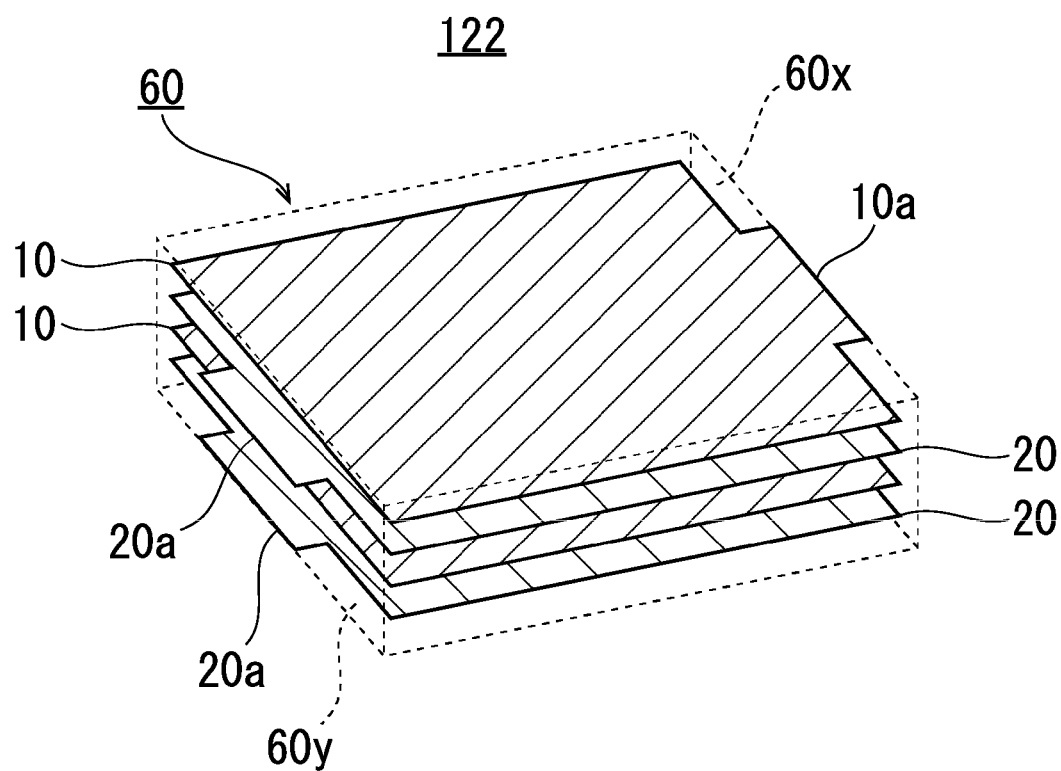
FIG. 16 is a perspective view of a multilayer structure in which the first electrodes and the second electrodes are stacked in FIG. 15.

FIG. 16 is a perspective view of the multilayer structure 60 formed by stacking the electrodes 10 and 20 illustrated in FIG. 15. As illustrated in FIG. 16, the first extraction part 10a is exposed on a side face 60x of the multilayer structure 60, and the second extraction part 20a is exposed on a side face 60y that is on the opposite side of the multilayer structure 60 from the side face 60x.

Figure 17:
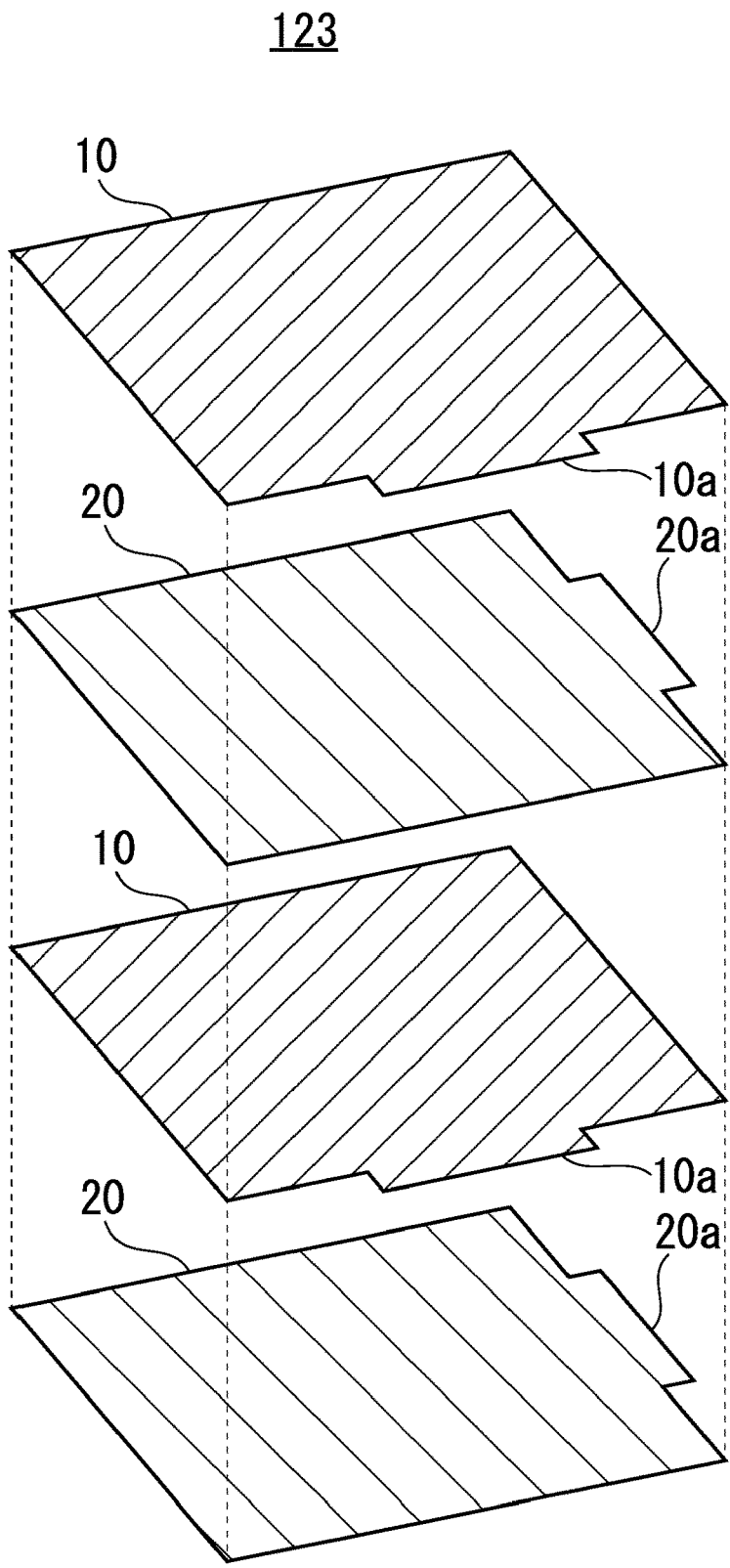
FIG. 17 is an exploded perspective view of a third all-solid battery in accordance with the third embodiment.

FIG. 17 is an exploded perspective view of the third all-solid battery 123 in accordance with the third embodiment.

As illustrated in FIG. 17, as in the first all-solid battery 121 (see FIG. 13), also in the third all-solid battery 123, the first electrode 10 includes the first extraction part 10a, and the second electrode 20 includes the second extraction part 20a. In the first all-solid battery 121, the second extraction part 20a is located at the position where the second extraction part 20a can overlap with the first extraction part 10a when the first electrode 10 is rotated 90 degrees clockwise in a top view as illustrated in FIG. 13. On the other hand, in the third all-solid battery 123, the second extraction part 20a is located at the position where the second extraction part 20a can overlap with the first extraction part 10a when the first electrode 10 is rotated 90 degrees anticlockwise in a top view.

Figure 18:
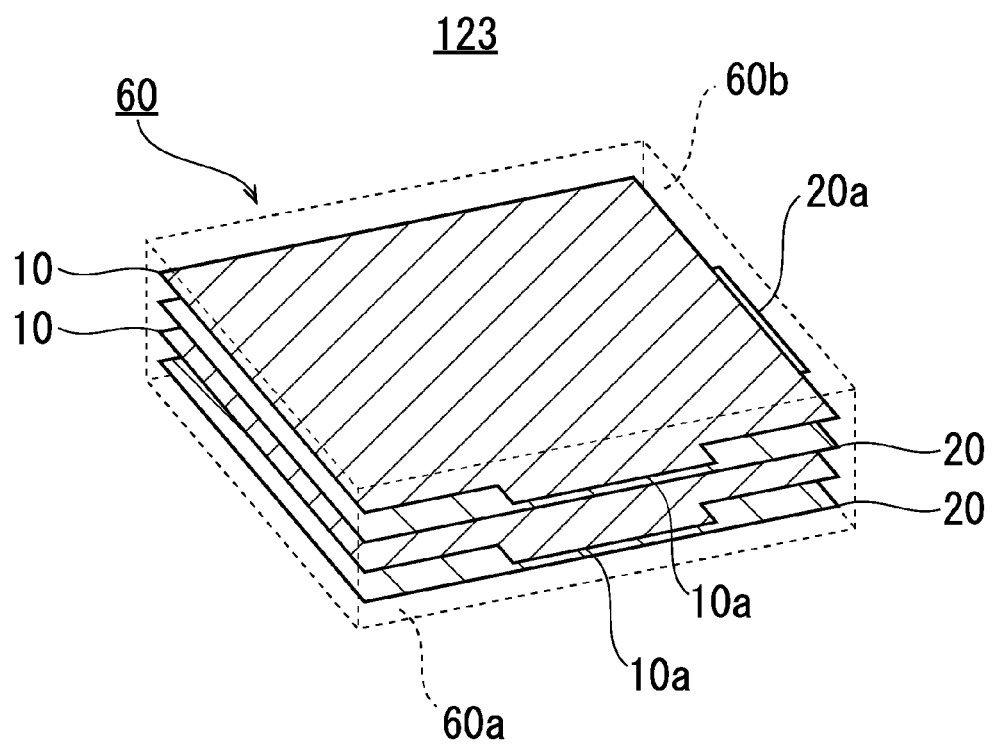
FIG. 18 is a perspective view of a multilayer structure in which the first electrodes and the second electrodes are stacked in FIG. 17.

FIG. 18 is a perspective view of the multilayer structure 60 formed by stacking the electrodes 10 and 20 illustrated in FIG. 17. As illustrated in FIG. 18, the first extraction part 10a of the first electrode 10 is exposed on the first side face 60a of the multilayer structure 60, and the second extraction part 20a of the second electrode 20 is exposed on the second side face 60b.

Figure 19:
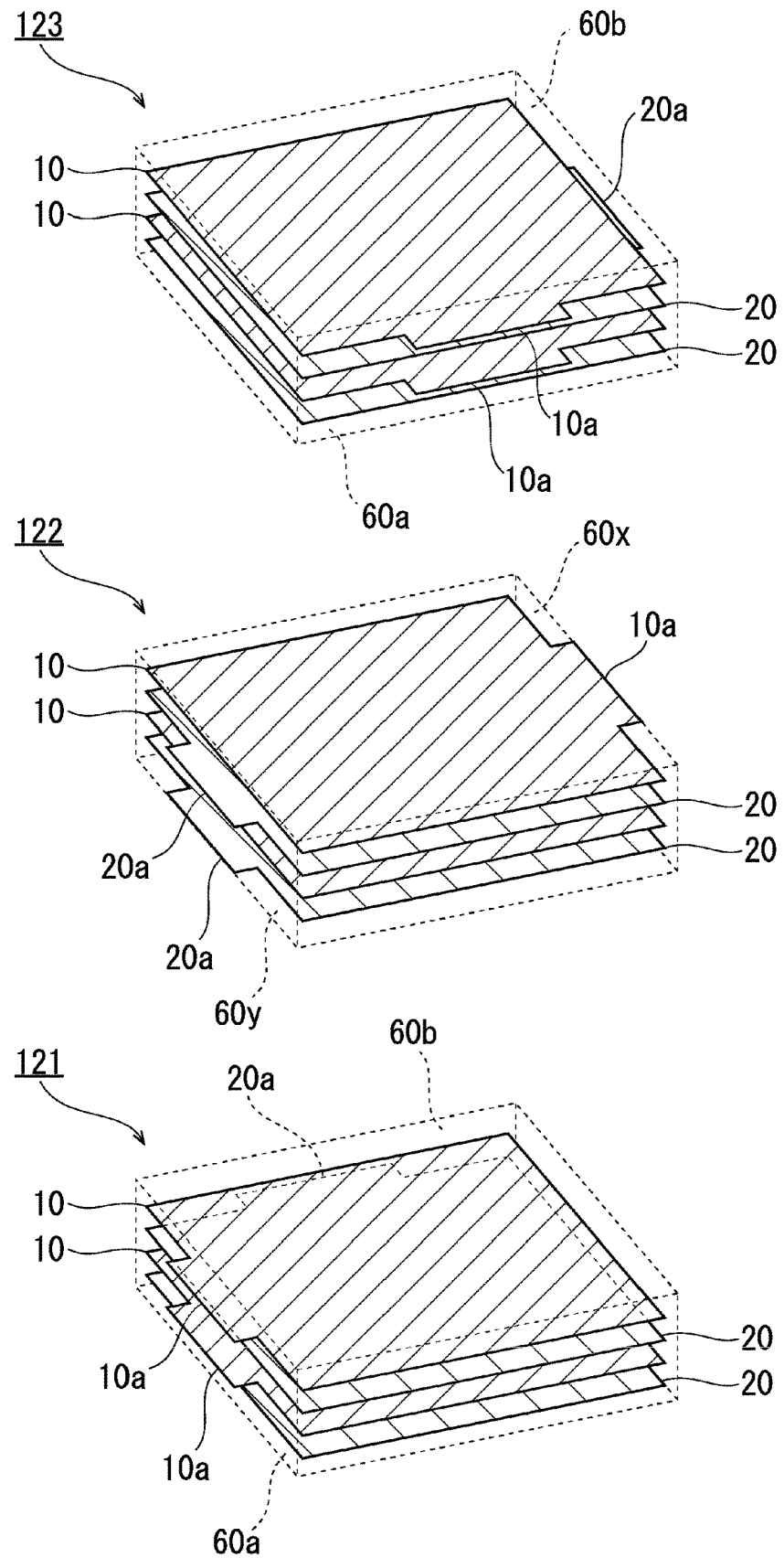
FIG. 19 is a perspective view (No. 1) illustrating a method of manufacturing a battery module in accordance with the third embodiment.
Figure 20:
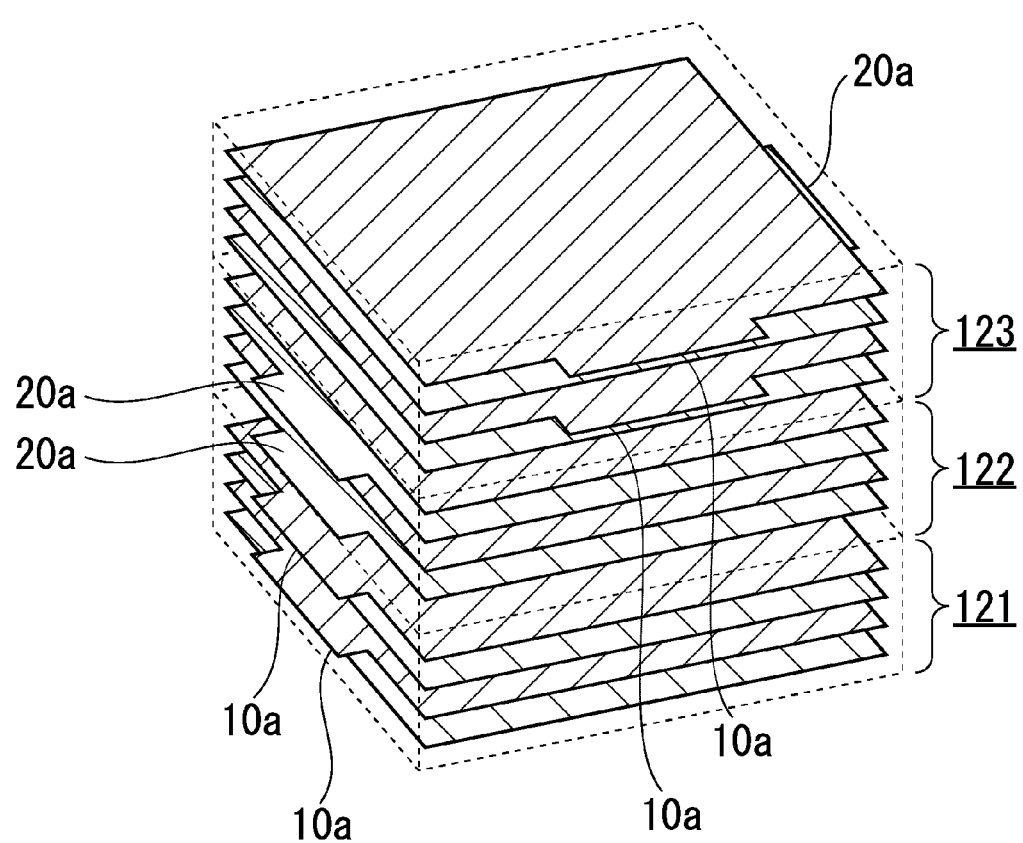
FIG. 20 is a perspective view (No. 2) illustrating the method of manufacturing the battery module in accordance with the third embodiment.
Figure 21:
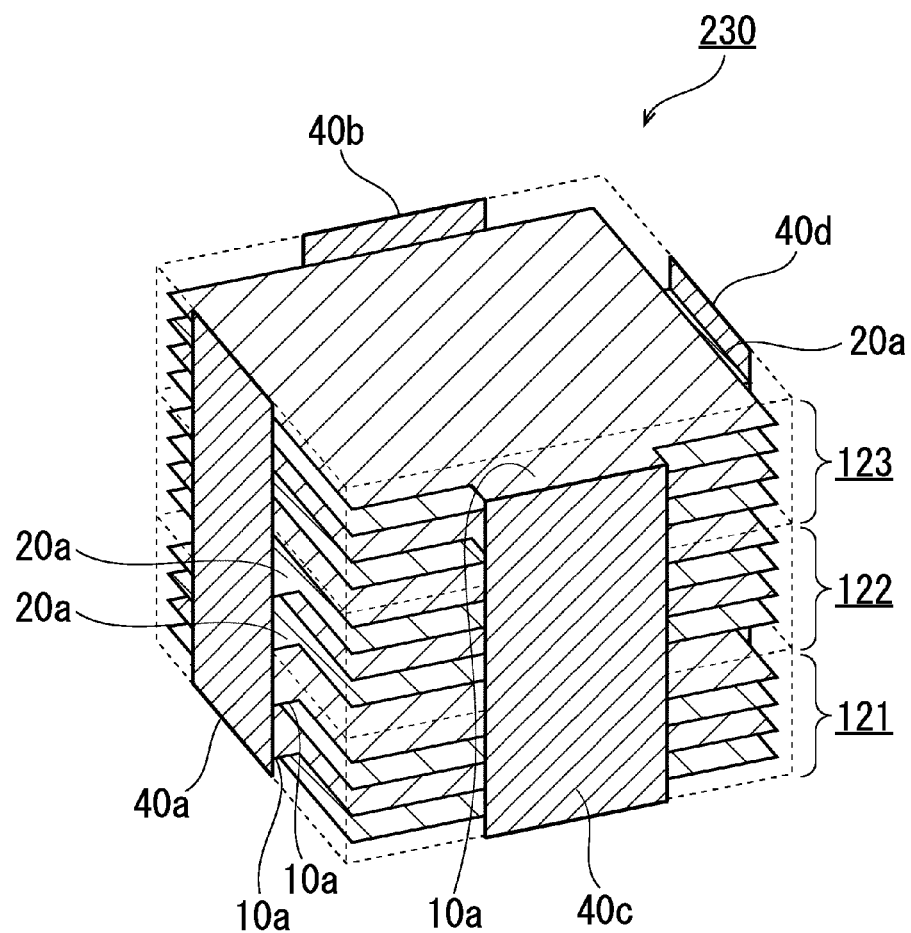
FIG. 21 is a perspective view (No. 3) illustrating the method of manufacturing the battery module in accordance with the third embodiment.

Next, a method of manufacturing a battery module including the first to third all-solid batteries 121 to 123 will be described. FIG. 19 to FIG. 21 are perspective views illustrating the method of manufacturing the battery module in accordance with the third embodiment.

As illustrated in FIG. 19, the positions of the first to third all-solid batteries 121 to 123 are adjusted. The positions of the first all-solid battery 121 and the second all-solid battery 122 are adjusted such that the first extraction part 10a of the first all-solid battery 121 overlaps with the second extraction part 20a of the second all-solid battery 122 in a top view.

Additionally, the positions of the second all-solid battery 122 and the third all-solid battery 123 are adjusted such that the first extraction part 10a of the second all-solid battery 122 overlaps with the second extraction part 20a of the third all-solid battery 123 in a top view.

Next, as illustrated in FIG. 20, the first to third all-solid batteries 121 to 123 are stacked in this order.

Then, as illustrated in FIG. 21, the first to fourth external electrodes 40a to 40d are formed on the four side faces of each of the first to third all-solid batteries 121 to 123. Among the first to fourth external electrodes 40a to 40d, the first external electrode 40a is an electrode that connects the first extraction part 10a of the first all-solid battery 121 and the second extraction part 20a of the second all-solid battery 122. The second external electrode 40b is coupled to the second extraction part 20a of the first all-solid battery 121 (see FIG. 19). Additionally, the third external electrode 40c is coupled to the first extraction part 10a of the third all-solid battery 123. Furthermore, the fourth external electrode 40d is an electrode that connects the first extraction part 10a of the second all-solid battery 122 (see FIG. 19) and the second extraction part 20a of the third all-solid battery 123.

Through the above process, a battery module 230 of the third embodiment is completed. In the battery module 230, the first all-solid battery 121 and the second all-solid battery 122 are connected in series through the first external electrode 40a. Additionally, the second all-solid battery 122 and the third all-solid battery 123 are connected in series through the fourth external electrode 40d. Thus, the first to third all-solid batteries 121 to 123 are connected in series. The electromotive force generated by these all-solid batteries 121 to 123 is drawn out to the outside through the second external electrode 40b and the third external electrode 40c.

Figure 22:
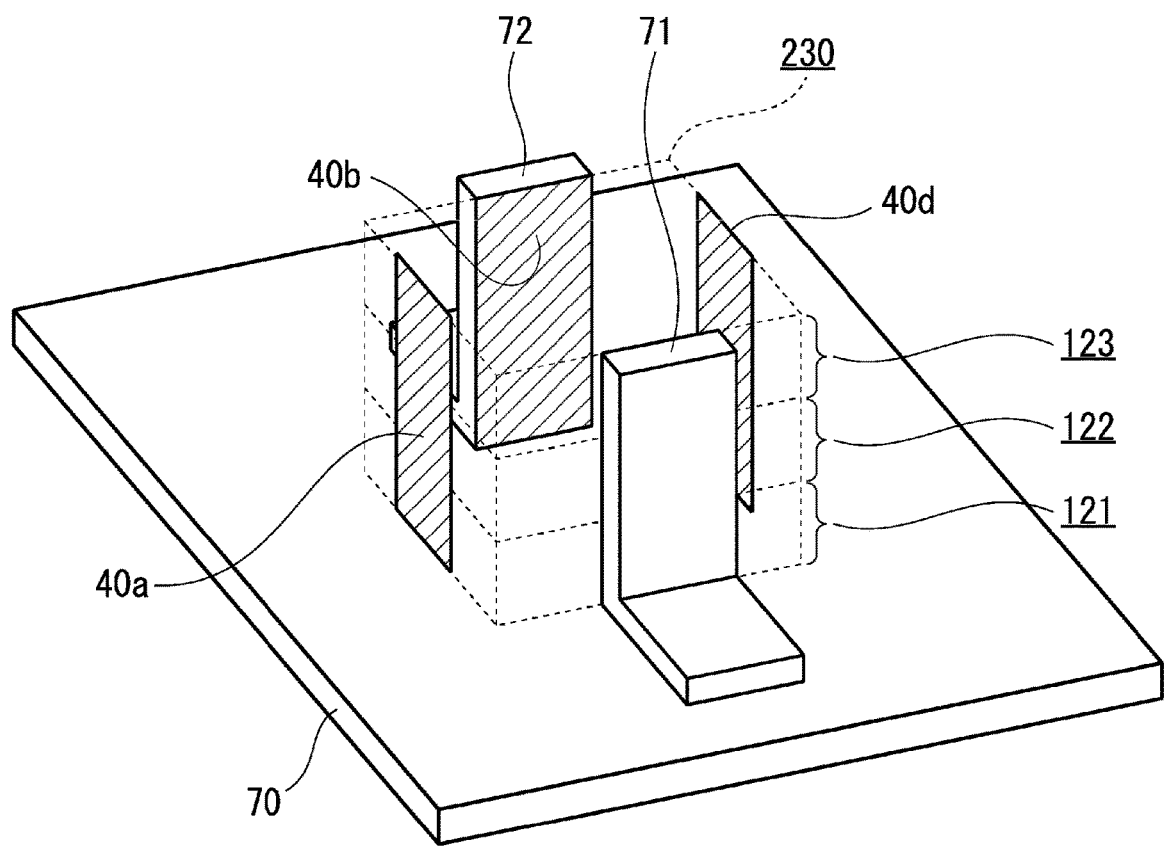
FIG. 22 is a perspective view illustrating a method of using the battery module in accordance with the third embodiment.

FIG. 22 is a perspective view illustrating a method of using the battery module 230.

In the example of FIG. 22, a pair of terminals 71 and 72 is disposed on the top face of the wiring substrate 70, and the terminals 71 and 72 sandwich the battery module 230 in between. The third external electrode 40c of the battery module 230 (see FIG. 21) is in contact with the terminal 71, and the second external electrode 40b is in contact with the terminal 72. This structure allows the electromotive force of the battery module 230 to be drawn out to the wiring substrate 70 through the terminals 71 and 72.

In the battery module 230 described above, the first to third all-solid batteries 121 to 123 are stacked and connected in series. Thus, the electromotive force three times the electromotive force of one all-solid battery is obtained. In addition, when the first to third all-solid batteries 121 to 123 are stacked, the area occupied by the battery module 230 in the wiring substrate 70 becomes smaller than the area occupied when the all-solid batteries are arranged in a plane. Thus, the narrow vacant space of the wiring substrate 70 is effectively used.

Next, a method of manufacturing the all-solid battery 100 of the first embodiment and the all-solid battery 110 of the second embodiment will be described. The first to third all-solid batteries 121 to 123 of the third embodiment can be manufactured by the same method.

Figure 23:
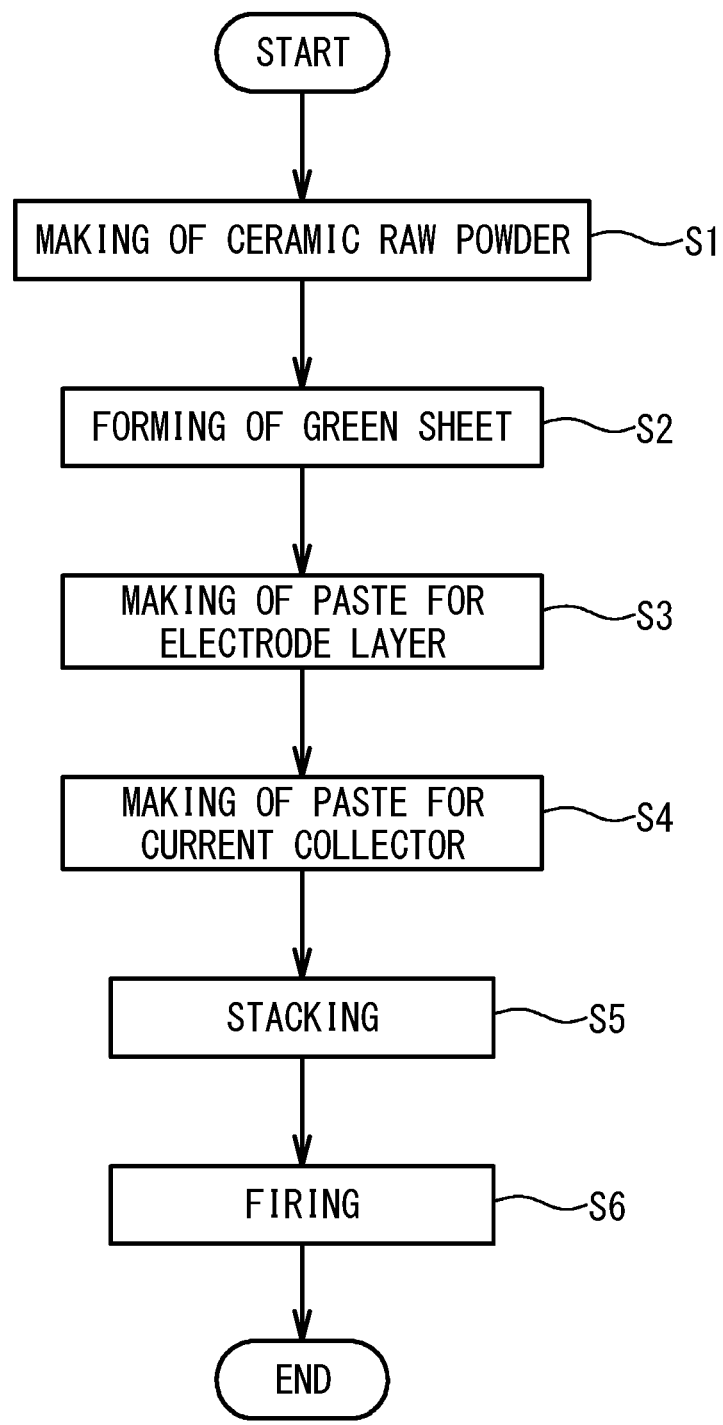
FIG. 23 is a flowchart of a method of manufacturing the all-solid battery in accordance with each embodiment.

FIG. 23 is a flowchart of the method of manufacturing the all-solid battery in accordance with each embodiment.

Making Process of Ceramic Raw Powder

First, powder of the phosphoric acid salt-based solid electrolyte structuring the solid electrolyte layer 30 is made. For example, it is possible to make the powder of the phosphoric acid salt-based solid electrolyte structuring the solid electrolyte layer 30, by mixing raw materials and additives and using a solid phase synthesis method or the like. The resulting powder is subject to dry grinding. Thus, an average grain diameter of the resulting power is adjusted to a desired one. For example, the average grain diameter is adjusted to a desired one with use of, for example, a planetary ball mill having $ZrO_2$ balls.

The additives include a sintering additive. Included as the sintering additive is one or more of glass components such as a Li—B—O-based compound, a Li—Si—O-based compound, a Li—C—O-based compound, a Li—S—O-based compound, and a Li—P—O-based compound.

Forming Process of Green Sheet

Then, the resulting powder is evenly dispersed into aqueous solvent or organic solvent together with a binding agent, a dispersing agent, a plasticizer and so on. The resulting powder is subject to wet crushing. Thereby, solid electrolyte slurry having a desired average grain diameter is obtained. In this case, a bead mill, a wet jet mill, a kneader, a high-pressure homogenizer, or the like may be used. It is preferable that the bead mill is used because adjusting of particle size distribution and dispersion are performed at the same time. A binder is added to the resulting solid electrolyte slurry. Thus, solid electrolyte paste is obtained. A green sheet is formed by applying the solid electrolyte paste. The application method is not limited to a specific method. For example, a slot die method, a reverse coat method, a gravure coat method, a bar coat method, a doctor blade method or the like may be used. It is possible to measure grain diameter distribution after the wet crushing, with use of a laser diffraction measuring device using a laser diffraction scattering method.

Making Process of Paste for Electrode Layer

Next, paste for electrode layer is made to make the first electrode layer 11 and the second electrode layer 21. For example, an electrode active material and a solid electrolyte material are highly dispersed by a bead mill or the like to make ceramic paste composed of only ceramic particles. Carbon paste containing carbon particles prepared not so as to be dispersed too highly may be made, and the ceramic paste and the resulting carbon paste may be mixed well. Carbon black may be used as the carbon particles.

Making Process of Paste for Current Collector

Next, paste for current collector is made to make the first current collector layer 12 and the second current collector layer 22. For example, powder of Pd, a binder, a dispersant, a plasticizer, and so on are evenly dispersed in water or organic solvent. Thus, the paste for current collector is obtained.

Stacking Process

First, the paste for electrode layer and the paste for current collector are printed on both faces of a green sheet. The printing method is not particularly limited, and may be a screen-printing method, an intaglio printing method, a relief printing method, or a calendar roll method. The screen printing is considered as the most typical method for fabricating the multilayer device having many thin layers stacked. However, use of ink-jet printing may be preferable when exceptionally fine electrode patterns or patterns having a special shape are printed.

Firing Process

Next, the obtained multilayer structure is fired. To inhibit disappearance of the carbon material contained in the paste for electrode layer, it is preferable to set an upper limit for the oxygen partial pressure of the firing atmosphere. More specifically, the oxygen partial pressure of the firing atmosphere is preferably $2 \times 10^{-13}$ atm or less. On the other hand, to inhibit the melting of the phosphoric acid salt-based solid electrolyte, it is preferable to set a lower limit for the oxygen partial pressure of the firing atmosphere. More specifically, the oxygen partial pressure of the firing atmosphere is preferably $5 \times 10^{-22}$ atm or greater. By setting the range of the oxygen partial pressure as described above, the disappearance of the carbon material and the melting of the phosphoric acid salt-based solid electrolyte are inhibited. The method of adjusting the oxygen partial pressure of the firing atmosphere is not limited to a specific method.

Thereafter, metal paste is applied to the side faces of the multilayer structure 60, and is fired. This process forms the first external electrodes 40a to the fourth external electrodes 40d. Alternatively, the first external electrode 40a to the fourth external electrode 40d may be formed by sputtering. The first external electrode 40a to the fourth external electrode 40d may be formed by plating the formed electrodes.

Through the above process, the fundamental structure of the all-solid battery is completed.

Although the embodiments of the present invention have been described in detail, the present invention is not limited to such a specific embodiment, and it is to be understood that the various change, substitutions, and alterations could be made hereto without departing from the spirit and scope of the invention.

What is claimed is:

1. An all-solid battery comprising:
a multilayer structure that has a substantially rectangular parallelepiped shape and includes a plurality of first electrodes and a plurality of second electrodes, the plurality of first electrodes and the plurality of second electrodes being alternately stacked with solid electrolyte layers interposed between the plurality of first electrodes and the plurality of second electrodes, the multilayer structure having an upper face and a lower face in a stacking direction and a first side face, a second side face, a fourth side face and a third side face arranged continuously in this order, the first side face being directly adjacent to the second side face and the third side face and facing the fourth side face, the second side face and the third side face facing each other,
a first extraction part exposed on the first side face, the first extraction part being a part of the first electrode;
a second extraction part exposed on the second side face, the second extraction part being a part of the second electrode;
a first external electrode coupled to the first extraction part on the first side face;
a second external electrode coupled to the second extraction part on the second side face,
a third extraction part exposed on the third side face, the third extraction part being a part of the first electrode; and
a fourth extraction part exposed on the fourth side face, the fourth extraction part being a part of the second electrode,
wherein the first external electrode is coupled to the third extraction part on the third side face, and
wherein the second external electrode is coupled to the fourth extraction part on the fourth side face.

2. An all-solid battery comprising:
a multilayer structure that has a substantially rectangular parallelepiped shape and includes a plurality of first electrodes and a plurality of second electrodes, the plurality of first electrodes and the plurality of second electrodes being alternately stacked with solid electrolyte layers interposed between the plurality of first electrodes and the plurality of second electrodes, the multilayer structure having an upper face and a lower face in a stacking direction and a first side face, a second side face, a fourth side face and a third side face arranged continuously in this order, the first side face being directly adjacent to the second side face and the third side face and facing the fourth side face, the second side face and the third side face facing each other,
a first extraction part exposed on the first side face, the first extraction part being a part of the first electrode;
a second extraction part exposed on the second side face, the second extraction part being a part of the second electrode;
a first external electrode coupled to the first extraction part on the first side face;

a second external electrode coupled to the second extraction part on the second side face;
a third extraction part exposed on the third side face, the third extraction part being a part of the first electrode;
a fourth extraction part exposed on the fourth side face, the fourth extraction part being a part of the second electrode;
a third external electrode coupled to the third extraction part on the third side face; and
a fourth external electrode coupled to the fourth extraction part on the fourth side face.

3. A battery module comprising:
a plurality of all-solid batteries, each of the all-solid batteries including:
  a multilayer structure that has a substantially rectangular parallelepiped shape and includes a plurality of first electrodes and a plurality of second electrodes, the plurality of first electrodes and the plurality of second electrodes being alternately stacked with solid electrolyte layers interposed between the plurality of first electrodes and the plurality of second electrodes, the multilayer structure having an upper face and a lower face in a stacking direction and a first side face, a second side face, a fourth side face and a third side face arranged continuously in this order, the first side face being directly adjacent to the second side face and the third side face and facing the fourth side face, the second side face and the third side face facing each other,
  a first extraction part exposed on the first side face, the first extraction part being a part of the first electrode,
  a second extraction part exposed on the second side face, the second extraction part being a part of the second electrode,
  a first external electrode coupled to the first extraction part on the first side face, and
  a second external electrode coupled to the second extraction part on the second side face,
wherein the first external electrode of a first all-solid battery of the plurality of all-solid batteries and the second external electrode of a second all-solid battery of the plurality of all-solid batteries are electrically connected,
wherein the first all-solid battery and the second all-solid battery are arranged in a plane,
wherein each of the plurality of all-solid batteries further includes:
  a third extraction part exposed on the third side face, the third extraction part being a part of the first electrode;
  a fourth extraction part exposed on the fourth side face, the fourth extraction part being a part of the second electrode;
  a third external electrode coupled to the third extraction part on the third side face; and
  a fourth external electrode coupled to the fourth extraction part on the fourth side face, and
the third external electrode of the first all-solid battery is coupled to the second external electrode of the second all-solid battery.

4. The battery module according to claim 3, wherein
a third all-solid battery and a fourth all-solid battery of the plurality of all-solid batteries are arranged in the plane,
the third external electrode of the third all-solid battery and the first external electrode of the first all-solid battery are connected,
the third external electrode of the fourth all-solid battery and the first external electrode of the second all-solid battery are connected, and
the first external electrode of the third all-solid battery and the fourth external electrode of the fourth all-solid battery are connected.

5. A battery module comprising:
a first all-solid battery;
a second all-solid battery;
a third all-solid battery; and
a fourth all-solid battery, wherein
each of the first all-solid battery, the second all-solid battery, the third all-solid battery, and the fourth all-solid battery includes:
  a multilayer structure that has a substantially rectangular parallelepiped shape and includes a plurality of first electrodes and a plurality of second electrodes, the multilayer structure having an upper face and a lower face in a stacking direction and a first side face, a second side face, a fourth side face and a third side face arranged continuously in this order, the plurality of first electrodes and the plurality of second electrodes being alternately stacked with solid electrolyte layers interposed between the plurality of first electrodes and the plurality of second electrodes, the first side face being directly adjacent to the second side face and the third side face and facing the fourth side face, the second side face and the third side face facing each other,
  a first extraction part exposed on the first side face, the first extraction part being a part of the first electrode,
  a second extraction part exposed on the second side face, the second extraction part being a part of the second electrode,
  a third extraction part exposed on the third side face, the third extraction part being a part of the first electrode,
  a fourth extraction part exposed on the fourth side face, the fourth extraction part being a part of the second electrode,
  a first external electrode coupled to the first extraction part on the first side face,
  a second external electrode coupled to the second extraction part on the second side face,
  a third external electrode coupled to the third extraction part on the third side face, and
  a fourth external electrode coupled to the fourth extraction part on the fourth side face,
the third external electrode of the first all-solid battery is electrically connected to the fourth external electrode of the fourth all-solid battery,
the second external electrode of the fourth all-solid battery is electrically connected to the fourth external electrode of the second all-solid battery,
the second external electrode of the second all-solid battery is electrically connected to the first external electrode of the third all-solid battery, and
the third external electrode of the third all-solid battery is electrically connected to the first external electrode of the first all-solid battery.

6. The all-solid battery according to claim 1, wherein the first side face and the second side face are orthogonal to each other.

7. The battery module according to claim 3, wherein the first side face and the second side face are orthogonal to each other.

8. The battery module according to claim 5, wherein the first side face and the second side face are orthogonal to each other.

* * * * *